(12) United States Patent
Raja et al.

(10) Patent No.: US 7,231,593 B1
(45) Date of Patent: Jun. 12, 2007

(54) SYSTEM AND METHOD FOR MANAGING A SPREADSHEET

(75) Inventors: Ramkumar N. Raja, Milpitas, CA (US); Jeffrey R. Duke, Oakland, CA (US); Christopher A. Pomerantz, Campbell, CA (US)

(73) Assignee: Balenz Software, Inc., Santa Clara, CA (US)

( * ) Notice: Subject to any disclaimer, the term of this patent is extended or adjusted under 35 U.S.C. 154(b) by 320 days.

(21) Appl. No.: 10/897,646

(22) Filed: Jul. 23, 2004

Related U.S. Application Data

(60) Provisional application No. 60/517,701, filed on Nov. 6, 2003, provisional application No. 60/489,777, filed on Jul. 24, 2003.

(51) Int. Cl.
*G06F 17/00* (2006.01)
(52) U.S. Cl. ...................................................... 715/503
(58) Field of Classification Search ................ 715/503, 715/504, 509
See application file for complete search history.

(56) References Cited

U.S. PATENT DOCUMENTS

| | | | | |
|---|---|---|---|---|
| 5,881,381 A * | 3/1999 | Yamashita et al. | .......... | 715/509 |
| 5,890,177 A * | 3/1999 | Moody et al. | .............. | 715/511 |
| 5,966,716 A * | 10/1999 | Comer et al. | ................ | 707/203 |
| 6,249,786 B1 * | 6/2001 | Wadewitz | ....................... | 707/6 |
| 7,096,082 B1 * | 8/2006 | Connelly | ...................... | 700/97 |
| 2004/0049730 A1 * | 3/2004 | Ishizaka | ...................... | 715/503 |
| 2004/0103365 A1 * | 5/2004 | Cox | ............................. | 715/503 |

OTHER PUBLICATIONS

"Invoice Numbering" Sep. 4, 1999 http://groups-beta.google.com/microsoft.public.excel.templates/msg/1ab3b57ae3706c61?dmode=print&hl=en.*

* cited by examiner

*Primary Examiner*—Stephen Hong
*Assistant Examiner*—Adam M. Queler
(74) *Attorney, Agent, or Firm*—Barnes & Thornburg LLP

(57) ABSTRACT

A system and method for managing a spreadsheet are disclosed. The method may include comparing two or more data statements, retrieving data from a portion of one of the data statements based on the comparison, and storing the data in a data cell of a standardized spreadsheet. The standardized spreadsheet may be a financial industry model spreadsheet and the data statements may be financial statements. The portion of the data statement may be one or more data cells of a spreadsheet or a spatial portion of a digital image. The method may further include retrieving mapping data associated with the data cell of the standardized spreadsheet. The mapping data may include identity data, such as location data of the portion, a mathematical equation or formula using such identity data, and an identifier, such as a numeric value or text label, associated with the one or more data cells of the standardized spreadsheet.

33 Claims, 13 Drawing Sheets

SYSTEM AND METHOD FOR MANAGING A SPREADSHEET

This application claims priority under 35 U.S.C. § 119(e) to U.S. Provisional Application Ser. No. 60/489,777, filed on Jul. 24, 2003, the entirety of which is hereby incorporated by reference herein, and to U.S. Provisional Application Ser. No. 60/517,701 filed on Nov. 6, 2003, the entirety of which is hereby incorporated by reference herein.

BACKGROUND OF THE DISCLOSURE

The present disclosure relates to systems and methods for managing spreadsheets, and more particularly to a system and method for managing a standardized spreadsheet such as an industry model spreadsheet.

In many business transactions, data statements are provided to a company by a customer. The data statements may include any type of data required by the company such as financial data, product quality data, demographic data, identification data, advertising data, or any other type of data used by the company. Accordingly, the data statements may take one of a number of forms including financial statements, product data statements, insurance statements, applications, and the like. The data statements are typically analyzed using predefined analysis procedures and/or compared with other data statements including historic data statements such as data statements from the same and/or other customers. Business decisions, such as loan approvals, may then be based on the results of such analysis and comparisons.

Once received, the data statements are typically entered into a data analyzing system to compare them with other data statements and/or analyze them using a predefined analysis algorithm. To provide consistency and improve accuracy of the analysis process, the analyzing systems typically accept the data of the data statements via a standardized spreadsheet. Because the data statements may take any one of a number of forms, may vary between customers and reporting periods (i.e., the time periods at which reoccurring data statements are provided by the customer), and are typically not organized in a predefined format, the data statements are usually entered into the standardized spreadsheet by hand. The standardized spreadsheet may be standardized based on any criteria adopted by the company or industry using the spreadsheet. For example, the standardized spreadsheet may be standardized based on a type of product, service customer profile or any other criteria capable of improving the consistency and accuracy of the analysis process. The process of entering data from the data statement into the standardized spreadsheet is commonly known as "spreading" the data statement. However, because the data statements typically vary and are entered in by hand, among other adverse factors, the spreading process may be inaccurate, inconsistent, and inefficient.

One particular example of the difficulties associated with spreading data statements involves the financial industry. The financial industry utilizes financial industry model spreadsheets as standardized spreadsheets to organize the financial data provided by various customers and improve analysis of such data. The finance industry models are typically based on broad industry classifications such manufacturing, retail, and service industries. The financial data is provided to a finance company, such as a bank or loan company, by the customer in the form of a financial statement. The financial statement may be provided to the finance company via email, a fax, through online acquisition from a public reporting agency, or through other means of conveyance. Accordingly, the financial statement may be embodied as a spreadsheet or fax. The financial statements are typically routed first to a relations manager of the finance company. The relations manager forwards the statements to a financial analyst. The analyst then spreads the financial statement into the financial industry model spreadsheet (i.e., inaccurately spread). To do so, the analyst enters the financial data contained in the financial statement into the financial industry model spreadsheet. However, because the financial statements may vary over time and across different customers, inaccuracies and inconsistencies may occur. Once the financial statement has been spread, a financial data analyzing system may be used to analyze the financial data. However, if the financial data has been inaccurately entered into the financial industry model spreadsheet, the analysis will be inaccurate. Accordingly, any business decision, such as granting or denying a loan application, made by the relations manger based on such inaccurate analysis will be erroneous.

SUMMARY OF THE DISCLOSURE

The present invention comprises one or more of the features recited in the appended claims and/or the following features which, alone or in any combination, may comprise patentable subject matter:

A method for managing a standardized spreadsheet includes comparing a first data statement and a second data statement. The method may also include determining a portion of the first data statement based on the comparing step. Further, the method may include retrieving data from the portion of the first data statement and storing the data in one or more data cells of a standardized spreadsheet. The data statement may be, for example, a financial statement or a product quality statement. The standardized spreadsheet may be a financial industry model spreadsheet. The data statement may be received via a network such as a publicly-accessible network, email, fax, or other transmission methodology. The data statement may be embodied as a spreadsheet or a digital image. In embodiments wherein the data statement is a spreadsheet, the data cell of the standardized spreadsheet may be mapped to one or more data cells of the spreadsheet based on mapping data associated with the one or more data cells. The mapping data may include identity data, such as location data, of the one or more data cells, a mathematical equation or formula for use with the identity data, and an identifier such as a numeric value or text label, associated with the data cell of the standardized spreadsheet. Alternatively, in embodiments wherein the data statement is a digital image, the data cell of the standardized spreadsheet may be mapped to a spatial portion of the digital image based on a set of coordinates associated with the spatial portion.

The method may further include indicating to the user that the data cell of the standardized spreadsheet has been mapped to the portion of the data statement by, for example, highlighting the portion. Additionally, the method may further include notifying the user that the data statement has been received by, for example, a notification email.

Alternatively, a method for managing a standardized spreadsheet may include retrieving mapping data associated with one or more data cells of a standardized spreadsheet and comparing a first data statement and a second data statement. The method may also include modifying the mapping data based on the comparing step and retrieving data from a portion of the first data statement based on the mapping data. The method may further include modifying the data based on the mapping data and storing the data in the one or more data cells of the standardized spreadsheet.

Yet further, a method for managing a standardized spreadsheet may include receiving a first data statement and displaying the first data statement and the standardized spreadsheet to a user. The method may also include determining a portion of the first data statement based on a first selection made by the user and determining a data cell of the standardized spreadsheet based on a second selection made by the user. The method may further include mapping the data cell of the standardized spreadsheet to the portion of the first data statement.

A method for automatically spreading data from a first spreadsheet to a standardized spreadsheet may include retrieving data from at least one data cell of the first spreadsheet and storing the data in a data cell of the standardized spreadsheet. The data cell(s) of the first spreadsheet may be determined based on the location of the at least one data cell.

A method for providing a spreadsheet may include displaying the spreadsheet to a user and highlighting a number of data cells of the spreadsheet in response to the user selecting a data cell of a standardized spreadsheet. The data cells may be determined based on a stored mapping associated with the data cell of the standardized spreadsheet.

A method for providing a digital image may include displaying the digital image to a user and highlighting a spatial portion of the digital image in response to the user selecting a data cell of a standardized spreadsheet. The spatial portion may be determined based on a stored set of coordinates associated with the data cell of the standardized spreadsheet.

A computer may include a processor and a memory device electrically coupled to the processor. The memory device may have stored therein a plurality of instructions which, when executed by the processor, may cause the processor to compare two or more data statements, determine a portion of one data statement based on the comparison, retrieve data form the portion, and store the data in one or more data cells of a standardized spreadsheet. The data statement may be, for example, a financial statement or a product quality statement. The standardized spreadsheet may be a financial industry model spreadsheet. The data statement may be received via a network such as a publicly-accessible network, email, fax, or other transmission methodology. The data statement may be embodied as a spreadsheet or a digital image. In embodiments wherein the data statement is a spreadsheet, the data cell of the standardized spreadsheet may be mapped to one or more data cells of the spreadsheet based on mapping data associated with the one or more data cells. The mapping data may include identity data, such as location data, of the one or more data cells, a mathematical equation or formula for use with the identity data, and an identifier, such as a numeric value or text label, associated with the data cell of the standardized spreadsheet. Alternatively, in embodiments wherein the data statement is a digital image, the data cell of the standardized spreadsheet may be mapped to a spatial portion of the digital image based on a set of coordinates associated with the spatial portion.

Additionally, the plurality of instructions when executed by the processor may cause the processor to display a data statement and a standardized spreadsheet to a user of a client machine, determine a portion of the data statement based on a first selection made by the user, determine a data cell of the standardized spreadsheet based on a second selection made by the user, and map the data cell of the standardized spreadsheet to the portion of the data statement.

Alternatively, the memory device may have stored therein a plurality of instructions which, when executed by the processor, cause the processor to retrieve mapping data associated with a data cell of a standardized spreadsheet, and determine at least one data cell of a first spreadsheet based on the mapping data, retrieve data from the data cell of the spreadsheet, and store the data in the data cell of a standardized spreadsheet. Further, the memory device may have stored therein a plurality of instructions which, when executed by the processor, cause the processor to display a first spreadsheet and a standardized spreadsheet to a user of a client machine, determine a data cell of the first spreadsheet based on a stored mapping associated with a data cell of the standardized spreadsheet, and highlight the data cell of the first spreadsheet in response to the user selecting the data cell of the standardized spreadsheet. Yet further, the memory device may have stored therein a plurality of instructions which, when executed by the processor, cause the processor to display a digital image and a standardized spreadsheet to a user of a client machine, determine a spatial portion of the digital image based on a stored set of coordinates associated with a data cell of the standardized spreadsheet, and highlight the spatial portion of the digital image in response to the user selecting the data cell of the standardized spreadsheet.

An article comprising a computer-readable signal-bearing medium may have therein a plurality of instructions which, when executed by a processor, cause the processor to compare a first data statement and a second data statement, determine a portion of the first data statement based on the comparing step, retrieve data from the portion of the first data statement, and store the data in one or more data cells of a standardized spreadsheet. Alternatively, the plurality of instructions may cause the processor to display a data statement and a standardized spreadsheet to a user of a client machine, determine a portion of the data statement based on a first selection made by the user, determine a data cell of the standardized spreadsheet based on a second selection made by the user, and map the data cell of the standardized spreadsheet to the portion of the data statement. Yet further, the plurality of instructions may cause the processor to display a first spreadsheet and a standardized spreadsheet to a user of a client machine, determine a data cell of the first spreadsheet based on a stored mapping associated with a data cell of the standardized spreadsheet, and highlight the data cell of the first spreadsheet in response to the user selecting the data cell of the standardized spreadsheet. Still further, the plurality of instructions may cause the processor to display a digital image and a standardized spreadsheet to a user of a client machine, determine a spatial portion of the digital image based on a stored set of coordinates associated with a data cell of the standardized spreadsheet, and highlight the spatial portion of the digital image in response to the user selecting the data cell of the standardized spreadsheet.

The above and other features of the present disclosure will become apparent from the following description and the attached drawings.

BRIEF DESCRIPTION OF THE DRAWINGS

Figure 5:
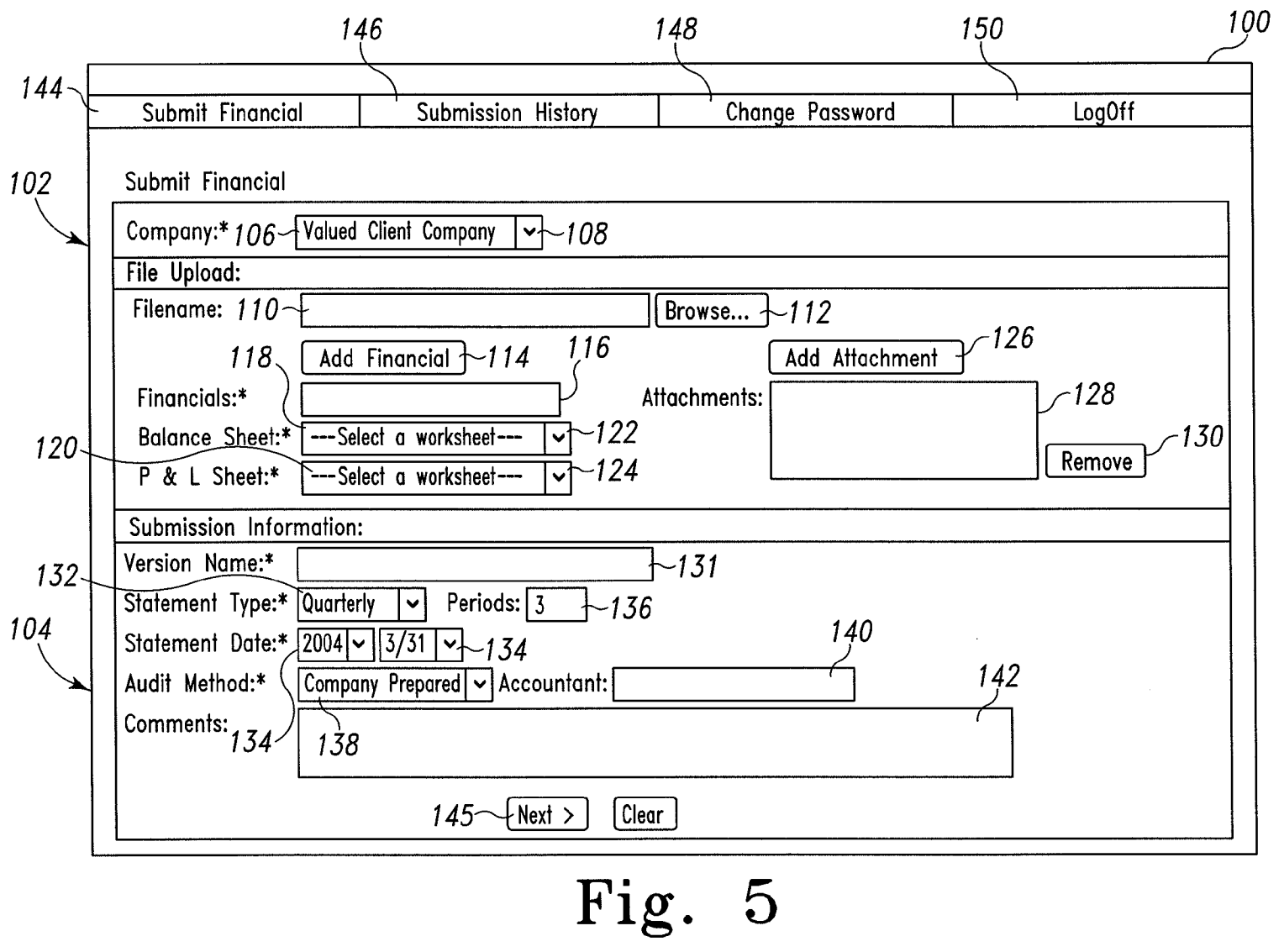

FIGS. 5–13 illustrate various screen displays which are displayed on a client machine during operation of the system of FIG. 1.

DETAILED DESCRIPTION OF THE DRAWINGS

Figure 1:
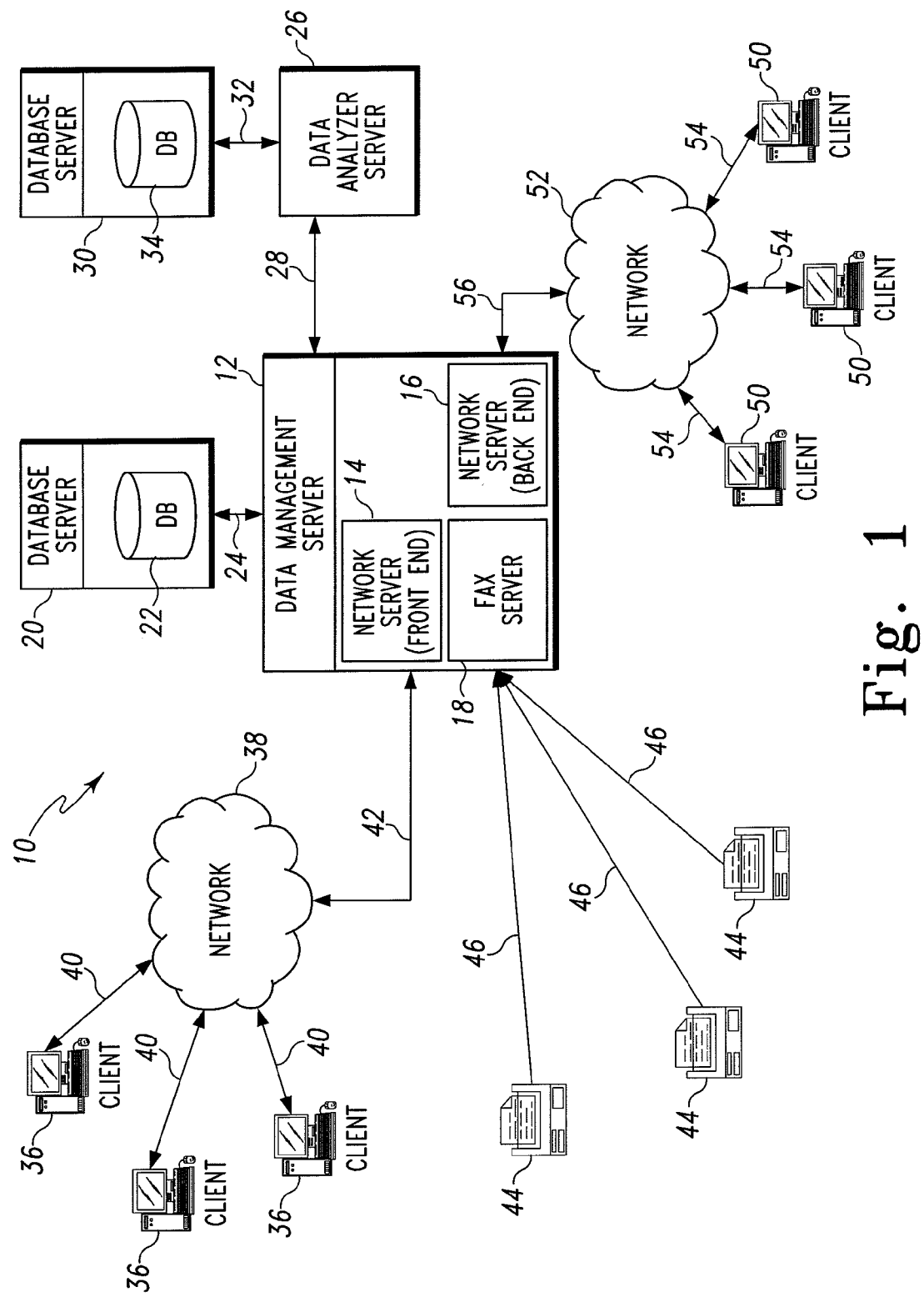
FIG. 1 is a simplified block diagram of a network-based system which incorporates the features of the present disclosure therein.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In regard to one illustrative embodiment, as shown in FIG. 1, a system 10 for managing a spreadsheet includes a data management server 12. The data management server 12 includes a front end network server 14 and a back end network server 16. Additionally, the data management server 12 may include a digital image server 18 such as a fax server. In FIG. 1, the front end network server 14, the back end network server 16, and the digital image server 18 are embodied as portions of a single data management server machine. However, in other embodiments, the data management server 12 may include separate, but communicatively coupled, servers 14, 16, 18.

The system 10 also includes a database server 20 having an associated database 22. The database server 20 is coupled to the data management 12 server via a communication link 24. The system 10 may also include a data analyzer server 26 coupled to the data management server 12 via a communication link 28. A database server 30 may be communicatively coupled to the data analyzer server 26 via a communication link 32. The database server 30 includes an associated database 34. Although shown as separate data servers, in some embodiments, the database servers 20, 30 are a single database server with separate databases 22, 34 stored therein.

A number of client machines 36 may communicate with the front end network server 14 of the data management server 12 via a network 38. The network 38 may be embodied as any type of network such as a local area network (LAN) or a wide area network (WAN). Moreover, in a specific illustrative embodiment, the network 38 is embodied as a publicly-accessible global network such as the Internet. Each of the client machines 36 is coupled to the network 38 via a communication link 40. Similarly, the front end network server 14 is coupled to the network 38 via a communication link 42. It should be appreciated that the communication links 40, 42 may be provided as any number of different types of data links including both wired and wireless data links. Moreover, it should also be appreciated that one or more intervening modems (not shown), data routers (not shown), and/or Internet service providers ("ISPs") (not shown) may be used to transfer the data between the data management server 12, the client machines 36, and the network 38.

A number of scanners 44 may communicate with the digital image server 18 of the data management server 12 via one of a number of communication links 46. The scanners 44 may be of any type of document scanner capable of producing a digital image of a document such as, but not limited to, a fax machine, a digital copier, and the like. The communication links 46 may be provided as any number of different types of data links including both wired and wireless data links. In one specific embodiment, the communication links 46 may form a portion of the public switched telephone network (PSTN) system. Alternatively, the scanners 44 may be communicatively coupled to a remote digital image server configured to communicate with the data management server 12 via the network 38 and communication link 42.

The system 10 also includes a number of client machines 50 communicatively coupled to the back end network server 16 of the data management server 12 via a network 52. The network 52 may be embodied as any type of network such as a LAN or WAN. Additionally, in some embodiments, the network 52 and the network 38 may be the same network. For example, the networks 38, 52 may be embodied as a publicly-accessible global network such as the Internet. Each of the client machines 50 is coupled to the network 52 via a communication link 54. Similarly, the back end network server 16 is coupled to the network 52 via a communication link 56. It should be appreciated that the communication links 54, 56 may be provided as any number of different types of data links including both wired and wireless data links. Moreover, it should also be appreciated that one or more intervening modems (not shown), data routers (not shown), and/or Internet service providers ("ISPs") (not shown) may be used to transfer the data between the data management server 12, the client machines 50, and the network 52. Further, in such embodiments, the network 52 may be communicatively coupled to both network servers 14, 16.

Although three client machines 36, three scanners 44, and three client machines 50 are illustratively shown in FIG. 1, it should be appreciated that the system 10 may include any number of client machines 36, scanners 44, and client machines 50. Additionally, the system may include any number of data management servers 12, data analyzer servers 26 and database servers 20, 30.

In a conventional manner, each of the data management server 12, front end network server 14, back end network server 16, digital image server 18, client machines 36, 50, data analyzer server 26, and/or the database servers 20, 30 includes a number of components commonly associated with such machines. For example, although not shown in detail in the drawings, each of the servers 14, 16, digital image server 18, client machines 36, 50, data analyzer server 26, and the database servers 20, 30 may include, amongst other things customarily included in such machines, a central processing unit ("CPU"), a non-volatile memory such as a read only memory ("ROM"), a volatile memory such as a random access memory ("RAM"), and one or more data storage devices. It should also be appreciated that such components may be integrated into a single housing or may be provided as a number of separate, discrete devices. It should also be realized that the data management server 12, front end network server 14, back end network server 16, digital image server 18, client machines 36, 50, data analyzer server 26, and/or the database servers 20, 30 may be operated with known, commercially available software operating systems.

As such, the front end network server 14 and back end network server 16 may be embodied as any type of commercially available network servers. The storage devices associated with the network servers 14, 16 maintain a number of databases and files which are utilized in the construction and operation of an information portal such as a website or user interface. The network servers 14, 16 may also function as gateways (not shown) for exchanging information across networks that are incompatible and that use different protocols. The gateway may be embodied as any combination of commercially available hardware and/or software that connects different types of networks such that information can be exchanged therebetween.

Similarly, the data servers 20, 30 may be embodied as any type of commercially available data servers. The storage devices associated with the data servers 20, 30 maintain a number of databases and files which are utilized in the storage and analysis of data. In particular, the data server 20 maintains one or more databases 22 which are used to store data statements waiting to be spread and standardized spreadsheets containing data previously spread. For example, the database 22 may have stored therein a number of financial statements received from customers and a number of financial industry model spreadsheets containing financial data previously spread from previously received financial statements. Similarly, the data server 30 maintains one or more databases 34 for storing standardized spreadsheets containing data spread from data statements received by the data management server 12, as well as, other application data used by the data analyzer server 26 to analyze data contained in the standardized spreadsheets.

The client machines 36, 50 preferably include output devices such as display monitors (not shown) for displaying a number of images to a user. As such, the clients 36, 50 may be embodied as any type of commercially available computing device such as a personal computer ("PC"). Moreover, the clients 36, 50 may also be embodied as "mobile" devices such as cellular phones, mobile data terminals, portable computers, personal digital assistants ("PDA"), or some other device of similar kind.

A customer may utilize one of the client machines 36 or scanners 44 to submit one or more data statements to the data management server 12. A data statement may include any type of data requested by a company. For example, the data statements may include financial data, product quality data, demographic data, identification data, advertising data, or any other type of data used by the company. Accordingly, the data statements may take one of a number of forms including financial statements, product data statements, insurance statements, applications, and the like. In one specific embodiment, the data statements are financial statements including financial data related to the customer. The data statements may be embodied as a spreadsheet, a digital image such as a fax, or formatted data using, for example, Extensible Markup Language (XML) or Hypertext Markup Language (HTML). In one specific embodiment, the data statements are embodied as an Excel spreadsheet created using Microsoft Excel which is commercially available from Microsoft Corporation of Redmond, Wash.

A customer may submit a data statement spreadsheet using one of the client machines 36. To do so, the customer may access the data management server 12 via the network 38 and the front end network server 14. In the case of an internet-based system (i.e., the network 38 is embodied as the Internet), the network server 14 is embodied as a web server and, as such, hosts a website which may be accessed by the customer from one of the client machines 36. In doing so, a data statement user interface is downloaded from the front end network server 14 to the customer's client machine 36. The customer may then provide identification information and attach a data statement for submission to the data management server 12. Alternatively, the customer may submit the data statement via email using an appropriate email software program. In such embodiments, the data statement is attached to an email and transmitted from the client machine 36 to the data management server 12 via the network 38. Further, in some embodiments, the customer may provide a hard copy of the data statement spreadsheet to the company. A user (e.g., a company analyst or relations manager) of the system 10 may then submit the data statement spreadsheet to the data management server 12 using one of the client machines 50. The submission process of the data statement spreadsheets via the client 36 and the submission process of the data statement spreadsheets via the client 50 are similar. In particular, the user of the client 50 may be presented with a data statement user interface similar to the data statement user interface presented to a customer via one of the client machines 36. Yet further, the data statements may be acquired by the company from a public reporting agency such as EDGAR Online commonly available at http://www.edgaronline.com. Such data statements are typically in the form of a spreadsheet and may be electronically submitted to the data management server 12 by a user.

A customer may also submit a data statement image, such as a data statement fax, using one of the scanners 44. To do so, the customer may provide a print out or other hard copy of the data statement to the scanner 44. The scanner 44 converts the hard copy of the data statement to a software copy (e.g., as an image of the hard copy) using a method commonly known and transmits the software copy of the data statement to the digital image server 18 of the data management server 12 via the communication links 46. In some embodiments, the digital image is provided to the data management server 12 via an email. For example, the digital image server 18 may be configured to produce an email containing the digital image upon receipt of the digital image from the scanner 44.

After the data statement has been received by the data management server 12, the server 12 stores the data statement in the database 22 of the database server 20. A user of the system 10 may then use a client machine 50 to spread the data statement. As used herein, the term "spread" refers to the process of transferring data from a data statement, such as a spreadsheet or fax, to a standardized spreadsheet, such as a financial industry model spreadsheet. Spreading may be done manually by entering in data contained in the data statement into the standardized spreadsheet by hand. Alternatively, spreading may be done automatically by copying data contained in the data statement to the standardized spreadsheet based on some criteria, such as identity data including location data, text labels, and spatial coordinates, as will be explained in greater detail below in regard to FIG. 2. Additionally, as used herein, the term "standardized spreadsheet" refers to any spreadsheet used by a company, corporation, or other institution to bring into conformity the reporting of information of a client or customer irrespective of how the information is presented or provided by the customer. Such spreadsheets may be standardized based on any one or more criteria defined by the company using the spreadsheet. For example, the spreadsheet may be standardized based on the type of product or service, type of company or industry, type of data reported, customer profiles, or any other criteria adopted by the company using the spreadsheet. One example of a standardized spreadsheet is a financial industry model spreadsheet.

To spread the data statement, the user communicates with the data management server 12 via the network 52 and the back end network server 16. In doing so, a spreading user interface is downloaded from the back end network server 16 to the user's client machine 50. Utilizing the spreading user interface, the user may manually or automatically spread the data statement, identify changes in the data statement relative to previously spread data statements, and the like, as discussed below in regard to FIGS. 5–13.

Once the data statement has been spread into the standardized spreadsheet, the standardized spreadsheet may be submitted to the data analyzer server 26. To do so, the data management server may use an application program interface (API) to convert the data contained in the standardized spreadsheet to a format acceptable to a data analysis software program stored on and executed by the data analyzer server 26. For example, in one specific embodiment, the data management server 12 first converts the data contained in the standardized spreadsheet to XML data using Extensible Markup Language (XML). The XML data is subsequently converted to a format acceptable by the data analysis software program using an API. Accordingly, by converting the data of the standardized spreadsheet first into XML data, the data can be subsequently formatted for any data analysis program by use of alternative APIs.

The data analysis software is stored on and executed by the data analyzer server 26. The data analysis software may be any type of software for analyzing data. Typically, the data analysis software is industry dependant and configured to analyze a particular type of data such as financial data, product quality data, and the like. In one specific embodiment, the data analysis software is Moody's KMV Financial Analyst commonly available from Moody's KMV of San Francisco, Calif.

Once the data has been submitted to the data analyzer server 26, a user may utilize the data analysis software to analyze the submitted data. Depending upon the specific data analysis software, such analysis may include comparison of data based on previously submitted data or standards, identification of risk factors, identification of invalid data, and the like. Based upon such analysis of the data, the user may make business decisions such as approving or denying a loan application, rejection of an order or product, adjustment of a market plan, or any other business decision based upon the analysis of the data.

In one specific embodiment of the present disclosure, an analyst of a finance company may use one of the client machines 50 to spread a financial statement received by the data management server 12 into a financial industry model spreadsheet. The financial statement may be in the form of a spreadsheet or a digital image such as a fax image. Once the financial statement has been spread, the analyst may submit the financial industry model spreadsheet to the data analyzer server 26. In doing so, the data contained in the financial industry model spreadsheet is converted into a format acceptable by the data analysis software being executed on the data analyzer server 26. Once the financial industry model spreadsheet has been submitted, the analyst may utilize the data analysis program to analyze the data based on one of a number of criteria. The analysis of the data may then be forwarded to a relations manager of the finance company. Based on such analysis, the relations manager may make a business decision such as the approval or denial of a loan application and the like. Additionally, the analysis may provide warnings of financial risk thereby allowing the relations manager to react accordingly.

Figure 2:
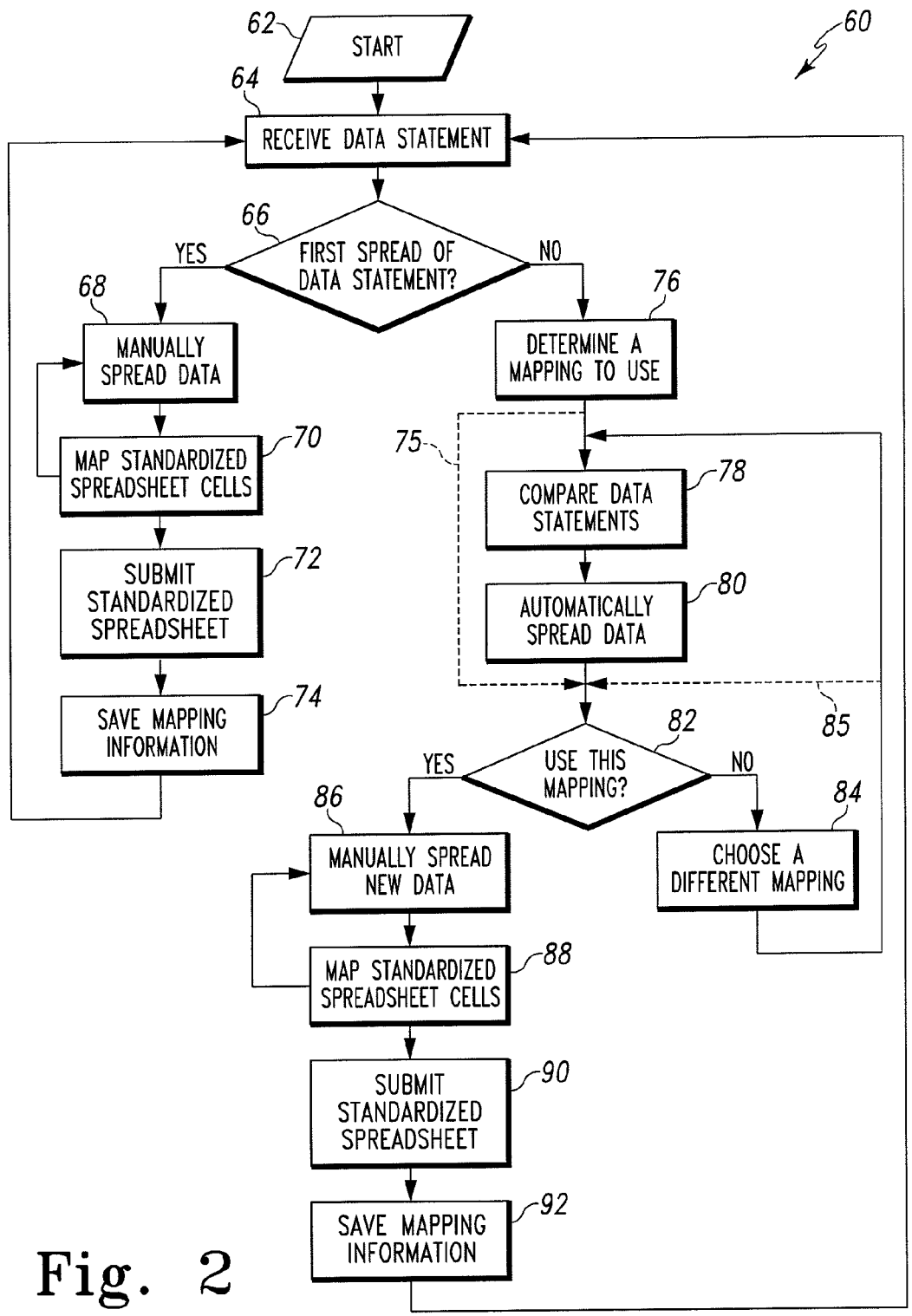
FIG. 2 illustrates an algorithm for spreading a data statement used by the system of FIG. 1.

Referring now to FIG. 2, an algorithm 60 for spreading a data statement is illustrated and begins with process step 62. In process step 62, initialization steps and procedures may be performed. For example, in process step 62, a communication link between the data management server 12 and one of the client machines 50 may be established. Subsequently, in process step 64, a data statement is received by the data management server 12. As discussed above in regard to FIG. 1, the data statement may be embodied as a spreadsheet, a digital image such as a fax, or other formatted data; may include any type of data such as financial data, product quality data, demographic data, identification data, advertising data; and may take one of a number of forms including financial statements, product data statements, insurance statements, applications, and the like. The data statement may be received from a client machine 36 via the network 38, from a scanner 44 via communication links 46, or from a client machine 50 via the network 52. For example, in some applications, an analyst may provide the data statement to the data management server 12 via the client machine 50.

In some embodiments, when a new data statement is received from a customer, the system 10 is configured to provide a notification to user associated with the customer. For example, a notification email may automatically be sent by the system 10 to the associated analyst. Additionally, if a new data statement has not been received from the customer within a predefined period of time, a notification may be provided to the associated relations manager, analyst, or other user. Based on such a notification, the user may contact the customer to determine the reason for the delay.

When a new data statement is received, the user may view a list containing newly received data statements and select one of the data statements to be spread. If the data statement is embodied as a digital image, the data statement may also need to be assigned to a particular company or customer before it may be spread. Once a user has selected a new data statement to be spread, the user is presented with a spreading user interface including the data statement and a standardized spreadsheet via the client machine 50.

In process step 66, it is determined if the current data statement is the first data statement to be spread for the particular customer submitting the data statement. The system 10 may determine if the current data statement is the first data statement for the customer to be spread based on one or more of a number of criteria including, for example, customer identification data, the existence of previously spread data statements, the existence of stored standardized spreadsheets, or the like.

If the current data statement is the first data statement for the customer to be spread, the algorithm 60 advances to process step 68. In process step 68, the data statement is manually spread into a standardized spreadsheet. To do so, the user selects a portion of the data statement. In embodiments wherein the data statement is a spreadsheet, the portion of the data statement may include one or more data cells of the spreadsheet. Alternatively, in embodiments wherein the data statement is a digital image, the portion of the data statement may include a spatial portion of the image. After the user has selected a portion of the data statement, the user selects a data cell of the standardized spreadsheet. If the data statement is a digital image, the user then enters the value contained in the portion of the data statement into the selected data cell of the standardized spreadsheet. Typically, financial values are entered in thousands or in some other currency format. However, if the current data statement is a spreadsheet, the system 10 (e.g., client 50 or server 12) is configured to automatically copy the data contained in the one or more data cells of the data statement spreadsheet to the selected data cell of the standardized spreadsheet. In addition, if the selected portion of the data statement spreadsheet includes more than one data cell, the system 10 is configured to combine the data contained in data cells of the data statement spreadsheet using an appropriate mathematical formula. For example, the system 10 may combine data cells of the data statement by summing the cells. The user may delete, change, or add to the mathematical formula. For example, the user may add a constant value to the formula or change one or more mathematical operators. Once the data contained in the data cells of the data statement have been combined, the resulting data value is stored in the selected data cell of the standardized spreadsheet.

In process step 70, the data cells of the standardized spreadsheet are mapped to the selected portions of the data statement from which the data originated. As used herein, the terms "map", "mapped", and "mapping" refer to any automated assignment of a mathematical correspondence or other relationship between (i) one or more data cells of a standardized spreadsheet and (ii) one or more data cells of a different spreadsheet, one or more spatial portions of an image as defined by a set of coordinates, or one or more other portions of a data statement. In one specific embodiment, the mathematical correspondence or other relationship may be embodied as a mathematical formula using data cell identification data of a data cell of a spreadsheet. In another specific embodiment, the mathematical correspondence or other relationship may be embodied as a set of coordinates associated with a portion of an image.

As illustrated in FIG. 2, the data cells of the standardized spreadsheet are mapped after each manual spread step (i.e., after each portion of the data statement is spread to a cell of the standardized spreadsheet). Accordingly, after each manual spread step has been mapped, the process flow of algorithm 60 loops back to process step 68 in which an additional portion of the data statement is spread. The process flow continues to loop between steps 68 and 70 until the user has spread and the system 10 has mapped all the portions of the data statement desired by the user. However, it should be appreciated that in other embodiments, the data cells of the standardized spreadsheet may be mapped after the data statement has been completely spread. The mapping of the standardized spreadsheet may be used during the spreading of successive data statements to automatically spread the data statement and/or provide information concerning the spread or mapping of the previous data statements to the user.

In embodiments wherein the data statement is a spreadsheet, the data cells of the standardized spreadsheet are mapped based on identity data associated with the data cells of the data statement spreadsheet selected by the user. As used herein, the term "identity data" refers to any data used to identify a portion of a data statement including, but not limited to, the location of the portion on the data statement, text labels associated with the portion, spatial coordinates of the portion, and XML tags associated with the portion. For example, if the data statement is a spreadsheet, the identity data includes the row and column numbers of the data cell(s) of the data statement spreadsheet. Accordingly, the data cells of the standardized spreadsheet are mapped based on the row and column numbers of the data cell(s) of the data statement spreadsheet selected by the user. In one illustrative embodiment, the mapping of the data cells of the standardized spreadsheet to the data cells of the data statement include identity data associated with the data cells of the data statement, any mathematical formula used to combine the data cells, and identity data associated with the data cell of the standardized spreadsheet selected by the user. The mapping may be stored and subsequently retrieved to perform automatic spreading on other data statements. The mapping may be stored using any format including XML. For example, one illustrative XML formatted mapping is shown below.

<ColumnID>1</ColumnID>
<TableName>Current Assets</TableName>
<ColumnName>Accts/Notes Rec-Other</ColumnName>
<Formula>=round('Sheet 1'$R9C6, 3)/1000</Formula>
<Value>23</Value>

Wherein, the data defined by the <ColumnID> is an identifier which identifies the data cell of the standardized spreadsheet that was selected by the user. In the illustrative embodiment, the identifier is a numeric value. However, in other embodiments, the identifier may be a text label or any other type of data capable of identifying the data cell of the standardized spreadsheet. The data defined by the <TableName> and <ColumnName> tags are used for display purposes. The data defined by the <Forumula> tag identifies the location of the data cells of the data statement spreadsheet that are mapped to the data cell of the standardized spreadsheet and defines the mathematical formula, if any, used with the data of the data cells of the data statement spreadsheet. The <Value> tag identifies the data value of the mathematical formula using the data of the data cells of the data statement spreadsheet. The data value identified by the <Value> tag is stored in the data cell of the standardized spreadsheet.

Alternatively, in embodiments wherein the data statement is a digital image, the data cells of the standardized spreadsheet are mapped based on a spatial portion of the digital image selected by the user. For example, when the user selects the portion of the fax, the coordinates of the selected portion are determined. The set of coordinates may subsequently be stored in relation to the data cell of the standardized spreadsheet as described above in regard to the data statement spreadsheet. The mapping (i.e., the set of coordinates) may be stored using any format including XML. For example, one illustrative XML formatted mapping is shown below.

<ColumnID>1</ColumnID>
<TableName>Current Assets</TableName>
<ColumnName>Accts/Notes Rec-Other</ColumnName>
<Formula>=40 {{//:F0X400Y200W40H20</Formula>
<Value>40</Value>

Wherein, the data defined by the <ColumnID> is an identifier (e.g., a numeric value, text label, or the like) which identifies the data cell of the standardized spreadsheet that was selected by the user. The data defined by the <TableName> and <ColumnName> tags are used for display purposes. The data defined by the <Formula> tag identifies the location of the data cells of the data statement spreadsheet that are mapped to the data cell of the standardized spreadsheet and the mathematical formula, if any. The "{{//" term is used to delimit the value or mathematical formula from the identity data (i.e., location data). The <Value> tag identifies the data value, as entered by the user, for the portion of the data statement image identified by the location data. The data value identified by the <Value> tag is stored in the data cell of the standardized spreadsheet.

Once all the selected data cells of the standardized spreadsheet have been mapped to the selected portions of the data statement, the standardized spreadsheet is submitted to the data analysis software of the data analyzer server 26 in process step 72. To do so, the data contained in the standardized spreadsheet is converted to a format acceptable by the data analysis software. For example, the data may first be converted to XML data and subsequently to a format acceptable by the data analysis software using an associated API.

In process step 74, the mapping data is stored on the database 22 of the data server 20. The mapping data may be retrieved to facilitate the automatic spreading of subsequent data statements. Additionally, the standardized spreadsheet is saved on the database 22. Once the mapping data and standardized spreadsheet has been saved, the algorithm 60 loops back to process step 64 to wait to receive additional data statements.

Returning now to step 66, if the current data statement is not the first data statement for the customer to be spread, the algorithm 60 advances to process step 76. In process step 76, a mapping to be use with the current data statement is determined. The most previous mapping (e.g., stored, XML formatted mapping data) is used. The most previous mapping is determined by comparing the current data statement and previous data statements to determine the most recent data statement, which has been spread and which associated mapping data has been stored, which is of the same type (i.e., Monthly, Quarterly, or Annually) as the current data statement. The mapping of the most recent previous data statement which most closely matches the type of the current data statement is selected. Once selected, the mapping data associated with the selected previous data statement is retrieved, for example, from database 22.

If the data statement is a spreadsheet or data table, the algorithm 60 advances to process step 78. However, if the data statement is a digital image, the algorithm 60 skips process step 78 and advances to process step 82 as indicated by dashed line 75. In process step 78, the previous data statement selected in process step 76 is compared with the current data statement. The data statements may be compared using any suitable comparing algorithm such as a text comparing algorithm. One illustrative algorithm 94 for comparing two data statements is illustrated in FIG. 3 and will be described now with the understanding that such a algorithm is merely illustrative and other algorithms for comparing two or more data statements may be used.

Figure 4:
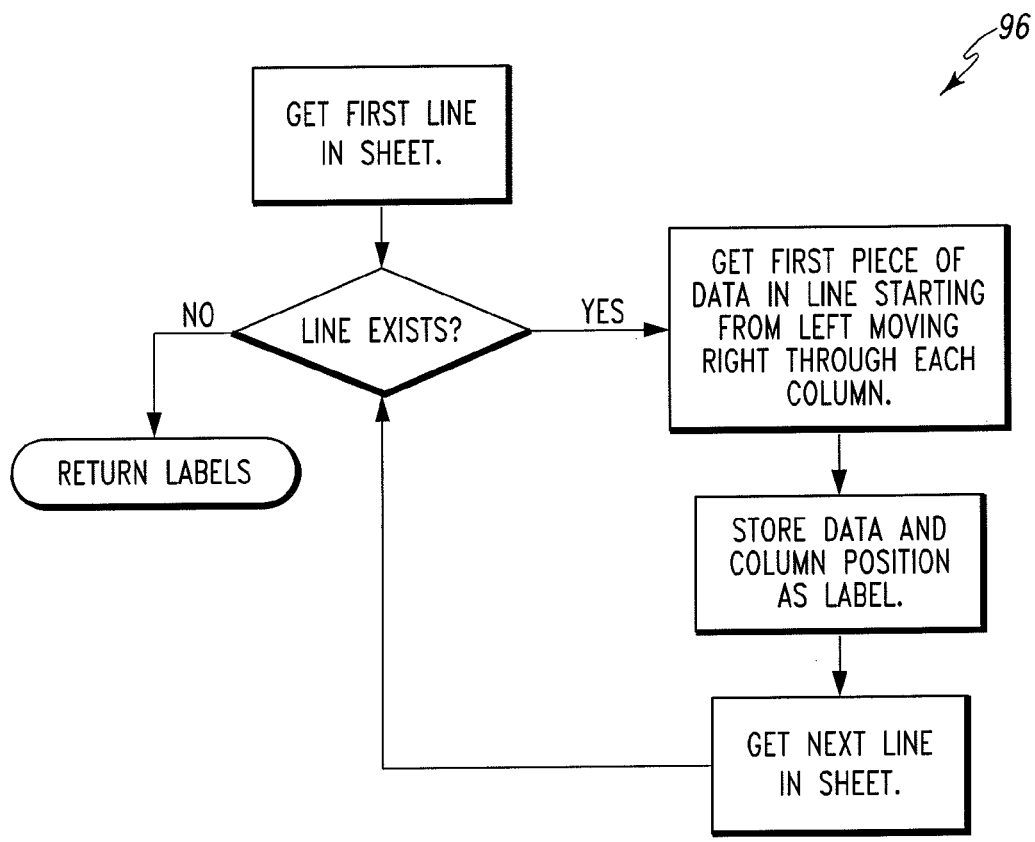
FIG. 4 illustrates an algorithm for extracting text labels from a data statement used in a process step of the algorithm of FIG. 3.

The algorithm 94 first retrieves the first sheet of previous statement. The first sheet may be, for example, a balance sheet or a profit and loss sheet of a financial statement. If no first sheet exists for the previous statement, the algorithm 94 exits. If a first sheet of the previous data statement does exist, the algorithm 94 retrieves the corresponding sheet of the current data statement. If there is no corresponding sheet of the current data statement available, the algorithm 94 retrieves the next sheet of the previous statement or exits if the next sheet of the previous statement is unavailable. Accordingly, the algorithm 94 attempts to locate corresponding sheets of the previous data statement and the current data statement. Once corresponding sheets of the data statements have been retrieved, the algorithm 94 extracts or retrieves the text labels associated with the data cells from each sheet. The text labels of the data statements may be extracted using any suitable algorithm. One illustrative algorithm 96 for extracting text labels of a data statement is illustrated in FIG. 4. Algorithm 96 first determines if the first line in the current sheet of the data statement exists. If not, the algorithm 96 exits. If the first line of the current sheet of the data statement does exist, the algorithm 96 retrieves the first piece of data in the line. The algorithm 96 retrieves such data using a left-to-right retrieval process across each column of the current line or row. Once the text label for the current row has been retrieved, the text label is stored along with the column position of the text label. Algorithm 96 subsequently retrieves the next line in the current sheet of the data statement. The algorithm 96 continues in the above-described process loop until no additional lines or rows of the sheet exist. Once the algorithm has inspected each line or row of the current sheet of the data statement, the algorithm 96 exits.

Figure 3:
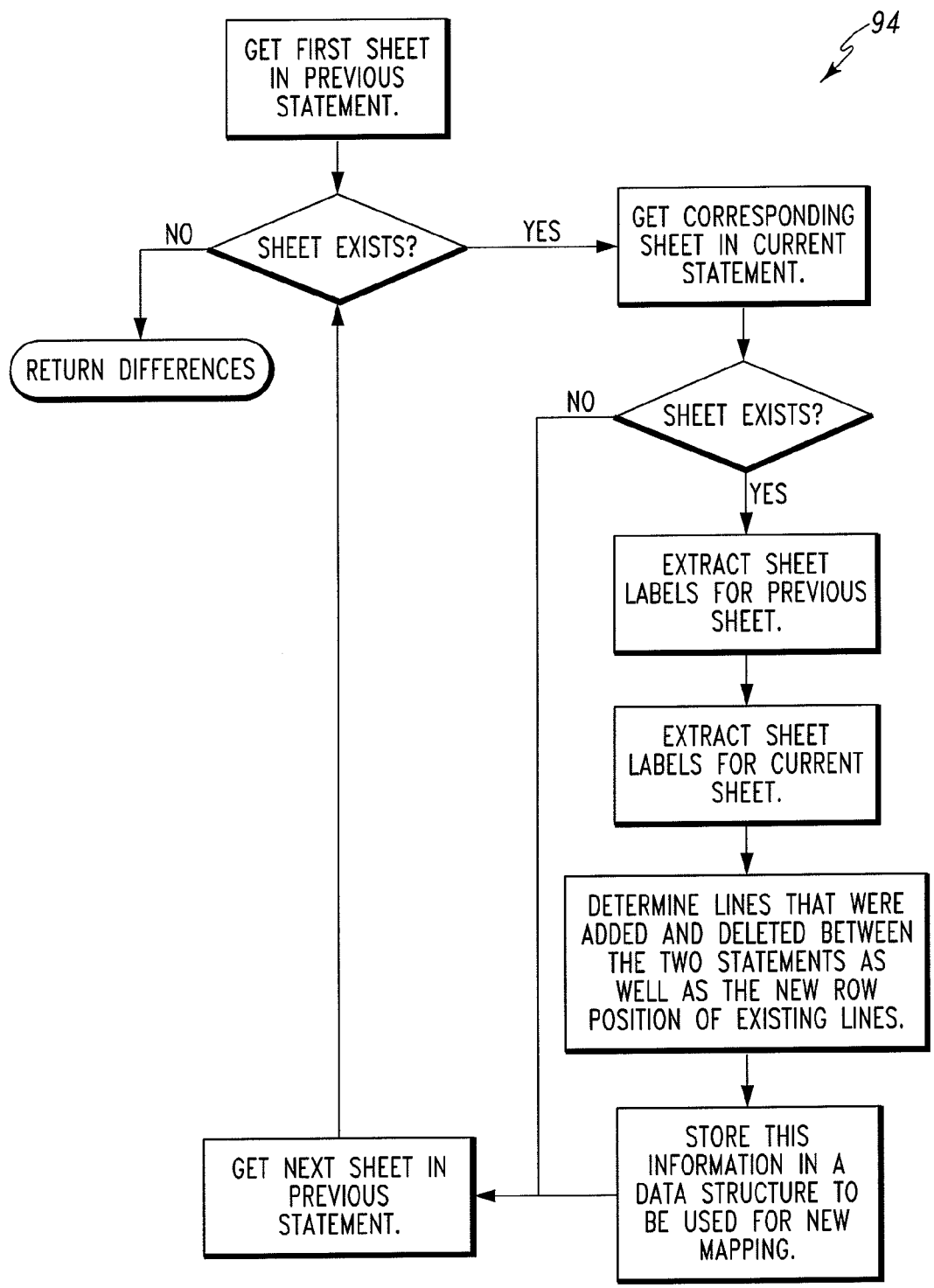
FIG. 3 illustrates an algorithm for comparing two data statements used by the algorithm of FIG. 2.

Referring now back to FIG. 3, after the text labels for each data statement have been retrieved, the algorithm 94 determines if any rows of the current data statement have been added, deleted, or moved relative to the previous data statement. To do so, the algorithm 94 compares the text labels and the position data associated with the text labels. Any differences between the text labels and positions are stored in a data structure or other memory location for use with the mapping data associated with the previous data statement during the automatic spreading of the current data statement, as described below.

Referring now back to FIG. 2, in process step 80 the current data statement is automatically spread into the standardized spreadsheet. To do so, in one specific embodiment, the mapping data associated with each data cell of the standardized spreadsheet is retrieved. The mapping data is updated or modified based on the comparison of the current and previous data statements performed in process step 78. Accordingly, the data structure or other memory location, in which the comparison data was stored in process step 78, is retrieved. For example, if the mapping data includes the row and column numbers of a data cell of the current data statement, such row and column numbers are updated to reflect the differences between the two data statements. Accordingly, if a row has been added above the mapped row, the row number in the current mapping data will be increased by one. Once the mapping data has been updated based on the comparison of process step 78, the data contained in the data cells as determined by the mapping data is retrieved and stored in the associated data cell of the standardized spreadsheet. The associated data cell of the standardized spreadsheet is identified in the mapping data, as discussed above in regard to process step 70. Additionally, if the mapping data includes any mathematical formula or equation, the data retrieved from the data cell(s) of the data statement is used with the mathematical formula or equation to determine a data value. The data value is subsequently stored in the associated data cell of the standardized spreadsheet.

In some embodiments, after the data statement has been automatically spread, the data portions of the data statement which have been mapped are determined and identified to the user. The data portions (i.e. data cells of a spreadsheet or spatial portions of a fax image) may be identified by highlighting the data portion. If the data statement is a digital image which has not yet been spread, then no data portion will be mapped or identified to the user. However, the user may view previously mapped data statements, including digital images, to view which data portions of the previous data statement which was mapped to data cells of the standardized spreadsheet. Additionally, the user may select a particular data cell of the standardized spreadsheet to highlight the particular mapped portion of the data statement. Accordingly, a user may analyze the mapping of previous data statements to determine how to map or adjust the current data statement. Further, after all the data cells of the data statement have been spread, any additional portions, i.e. data rows, of the data statement may be indicated to the user by, for example, highlighting the portion. Additionally, any portions of the data statement which were deleted are indicated to the user by, for example, highlighting the portion.

The algorithm 60 subsequently advances to process step 82. In process step 82, the algorithm determines if the current mapping (e.g., the previous data statement selected to be used as the mapping) is correct. The user may review the previous data statement and/or the automatic spreading to determine if another mapping is desired. If so, the algorithm advances to process step 84 wherein a different mapping is chosen. The different mapping (e.g., previous data statement) may be chosen affirmatively by the user or, in some embodiments, may be automatically selected by the algorithm 60 using the method described in process step 76. The algorithm then advances back to process step 78 if the current data statement is a spreadsheet or data table and, alternatively, to process step 82 if the current data statement is a digital image as indicated by dashed line 85. However, if the user determines that the current mapping is the correct mapping to use, the algorithm 60 advances to process step 86.

In process step 86, any new data portions (i.e., new data cells or spatial portions) are manually spread into the standardized spreadsheet. The process used to manually spread new data portions is similar to the process used in step 68. However, in some applications, the new portions may be spread by expanding a previously mapped data portion of the data statement to include the new data. For example, if the data statement is a digital image including a new line of data, an existing mapped spatial portion may be expanded to include the new row of data and the value added manually to the value sorted in the associated (i.e. mapped) data cell of the standardized spreadsheet. Additionally, mapped data portions may be altered to account for deleted or removed data or data portions. For example, if the data statement is a spreadsheet and a data row of a mapped data portion of the data statement spreadsheet including several data rows has been removed, the data portion may be adjusted accordingly.

In process step 88, any newly spread data portions of the current data statement are mapped to the associated data cells of the standardized spreadsheet. The process used to map the data portions to the data cells of the standardized spreadsheet is similar to the mapping process described above in regard to process step 70. As illustrated in FIG. 2, the data cells of the standardized spreadsheet are mapped after each manual spread step (i.e., after each new portion of the data statement is spread to a cell of the standardized spreadsheet). Accordingly, after each manual spread step has been mapped, the process flow of algorithm 60 loops back to process step 86 in which an additional new portion of the data statement is spread. The process flow continues to loop between steps 86 and 88 until the user has spread and the system 10 has mapped all the new portions of the data statement desired by the user.

After any new portions have been mapped to selected data cells of the standardized spreadsheet, the standardized spreadsheet is submitted to the data analysis program of the data analyzer server 26 in process step 84. To do so, the data contained in the standardized spreadsheet is converted to a format acceptable by the data analysis program. Once the standardized spreadsheet has been submitted, the mapping data for the current data statement is stored on the database 22 of the data server 20. Additionally, the standardized spreadsheet is saved on the database 22. Once the mapping data and standardized spreadsheet has been saved, the algorithm 60 loops back to process step 64 to wait to receive additional data statements.

Referring now to FIGS. 5–9, data statements embodied as spreadsheets may be submitted to the data management server 12 and manually and/or automatically spread into a standardized spreadsheet which may subsequently be submitted to the data analyzer server 26. To do so, a data statement spreadsheet may be submitted to the data management server 12 via a data statement user interface 100 illustratively shown in FIG. 5. The user interface 100 may be used by a customer, via client 36 and network 38. Additionally, a similar user interface is usable by a user of the system 10 to submit data statements via client 50 and network 52. The user interface 100 will be described herein with the understanding that the user interface usable by the user may be similar with similar functionality. The user interface 100 includes a number of data fields for submission of identification data related to the data statement. Identification data may be entered into the data fields by direct data input (i.e., the entering of data via a keyboard coupled to the clients 36, 50) or by choosing a selection from an associated pull-down menu of choices. The pull-down menu may be activated or "called-up" by selection of an associated pull-down button. For example, the user interface 100 includes a company name field 106 for storing the name of the company submitting the data statement. The company name may be entered from a pull-down menu accessible via a pull-button 108. The user interface 100 also includes a file upload section 102 and a submission information section 104. The file upload section 102 includes a filename data field 110. A file may be selected by directly typing the name of the file in the data field 110 or by using a browse button 112 to locate and select the file After the customer or user has selected a file, the filename of the file appears in the filename data field 110. The customer or user may then identify the file as the data statement (e.g., financial statement) to be submitted by selecting an add financial button 114. After the user has identified the file as the data statement, the user may select the Balance sheet via button 122 and the Profit and Loss sheet via button 124 of the data statement from associated pull-down tables. Further, the customer or user may submit additional files or documents by selecting an add attachment button 126. Upon selection of button 126, the file identified in the data field 110 is included as an attachment to the data statement and the name of the file appears in an attachment box 128. The customer or user may remove any unwanted attachments listed in box 128 by selecting the attachment name and selecting a remove button 130.

The submission information section 104 of the user interface 100 includes a Version Name data field 131 in which the customer or user enters the name of the data statement submission for later reference. Additionally, the customer or user enters the statement type and date of the data statement in data fields 132 and 134, respectively. The user also indicates the number of periods included in the data statement via data field 136. The customer or user further indicates the audit method used in data field 138 and the name of an accountant in data field 140. Further, additional notes or comments may be drafted in a comment field 142.

Once the data statement has been uploaded and all the applicable information has been entered into the user interface 100, the data statement and associated information may be submitted to the data management server 12 via selection of a next button 145. In some embodiments, the customer may be asked for an electronic signature or other identification after selection of the button 145. Additionally, the customer or user may review the submission history for the company via selection of a button 146, change their password via selection of a button 148, logoff via selection of a button 150, or return to the user interface 100 via selection of button 144.

Figure 6:
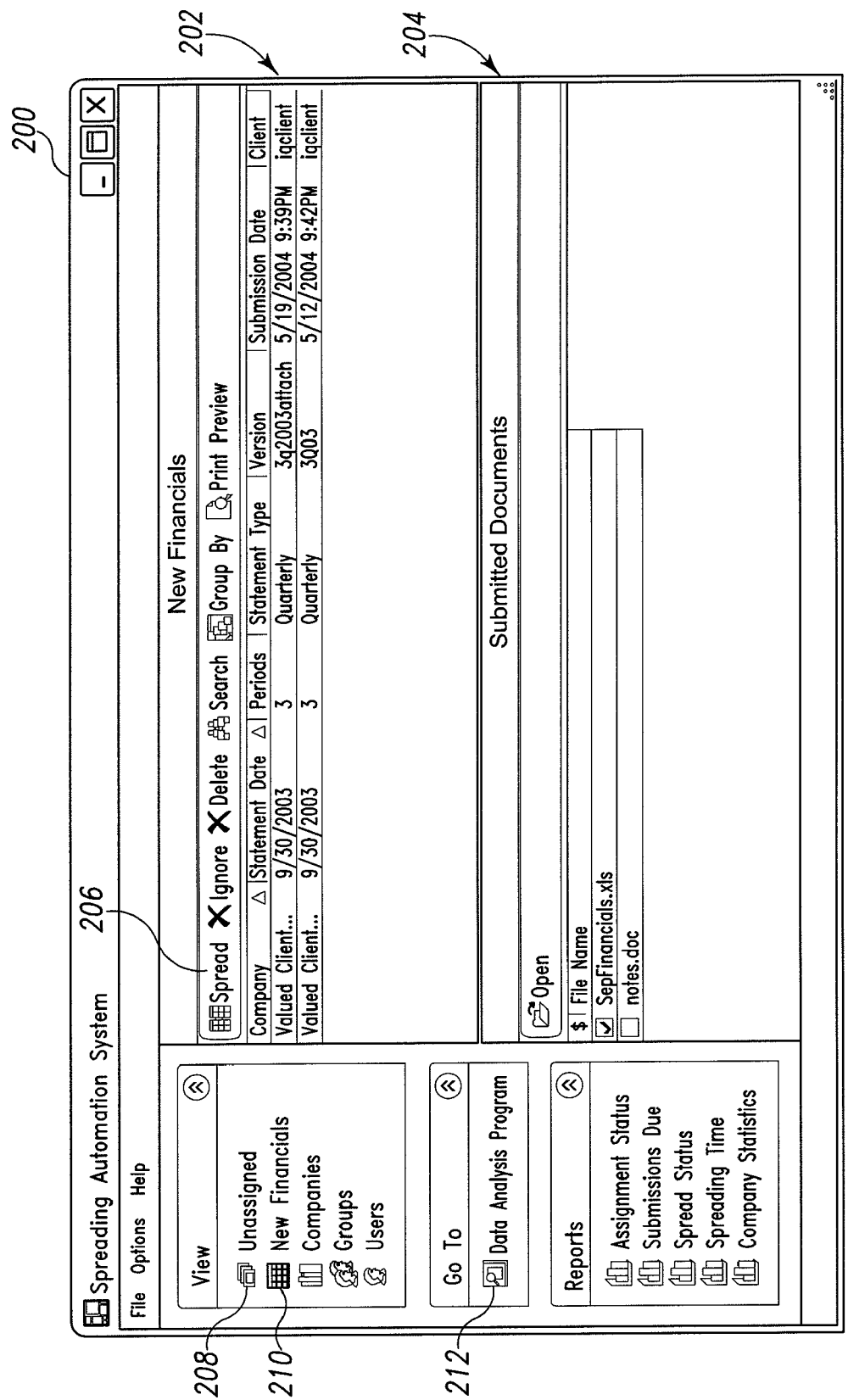

Once a data statement is received by the data management server 12, a user (e.g., a company analyst) may log into the server 12 via one of the client machines 50 and the network 52 to spread the data statement. When a user logs into or otherwise connects to the data management server 12, a spreading user interface 200 is downloaded to the client machine 50 and presented to the user. As illustrated in FIG. 6, the user interface 200 notifies the user of newly received data statement spreadsheets that are waiting to be spread. A new financial pane 202 and a submitted documents pane 204 are displayed on the user interface 200. Any newly received data statement spreadsheets waiting to be spread are displayed in the new financial pane 202 along with associated data such as the name of the company that submitted the data statement, the statement date, the statement type, the statement version, and the submission date. However, additional associated data may be displayed in other embodiments. When a data statement is selected in the new financial pane 202, any documents or files submitted with the data statement are displayed in the submitted documents pane 204. To spread a data statement, the user may select the data statement in the new financial pane 202 and select a spread button 206.

The user interface 200 also includes a button 208 to view data statements that have been received but have not been assigned to a company. Such data statements are typically digital data statements such as digital images and must be assigned to a company before being spread. Additionally, a button 210 is selectable by the user to review newly received data statements. When a user selects the button 210, the financial pane 202 and the submitted documents pane 204 are presented to the user as illustrated in FIG. 6. Further, the user may select button 212 to access the data analysis software and perform analysis on submitted standardized spreadsheet data.

Figure 7:
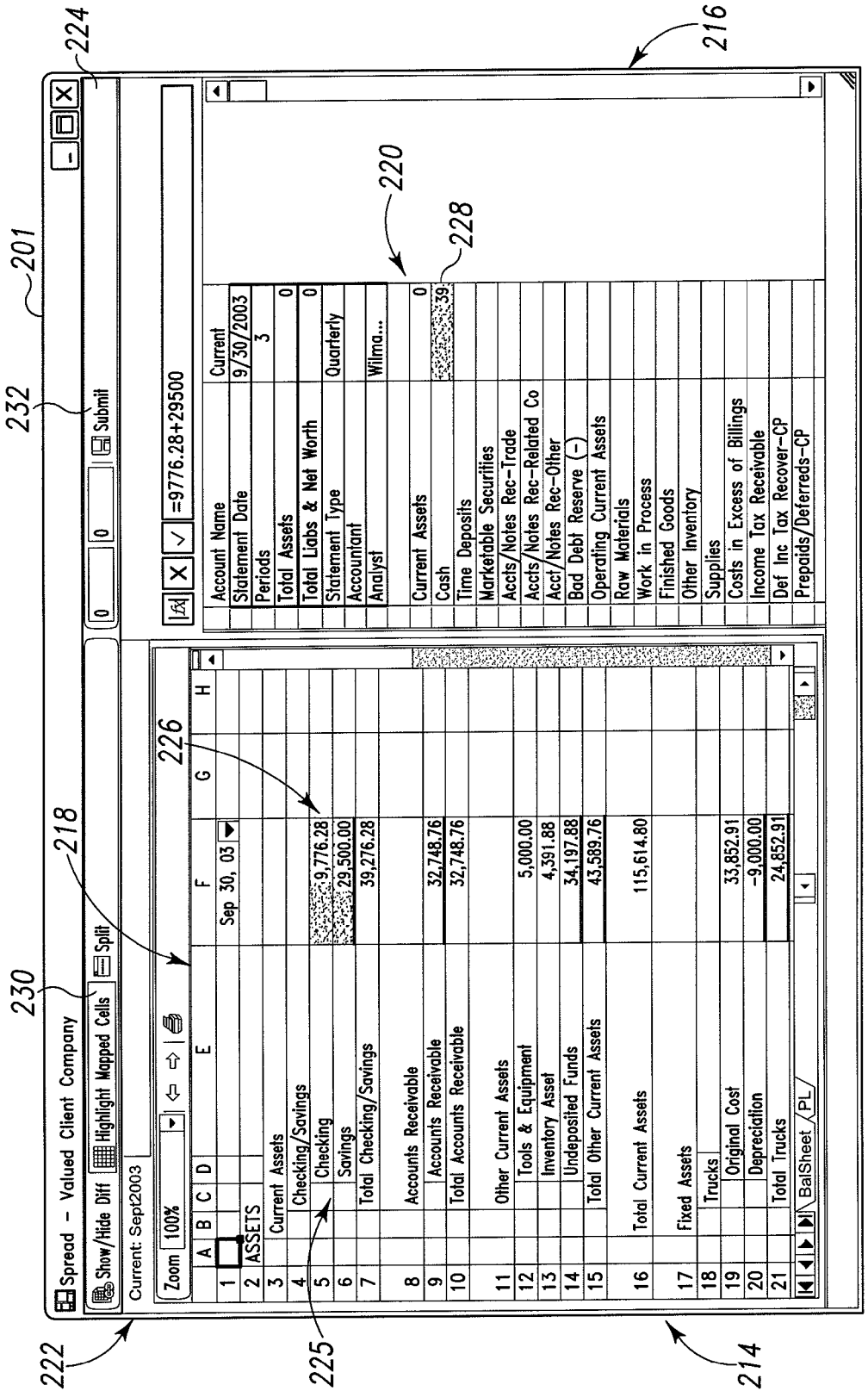

As shown in FIG. 7, when a user selects a new data statement to be spread, a data statement pane 214 and a standardized spreadsheet pane 216 are displayed in a user interface 201. The current data statement 218 (i.e., spreadsheet) is displayed to the user in the pane 214 and a standardized spreadsheet 220 is displayed in the pane 216. If the data statement 218 is the first data statement to be spread for the company, the user interface 201 will appear similar to the user interface 201 illustrated in FIG. 7. Because there is no previous mapped standardized spreadsheet, the pane 216 includes only the current standardized spreadsheet 220 having empty data cells. Additionally, because there is no previous data statement, a data statement selection bar 222 located above the data statement 218 includes only the current data statement 218.

Because a data statement has never been spread for the customer, the current data statement 218 must be manually spread into the standardized spreadsheet 220. To do so, the user may select a portion of the current data statement 218. For example, the user may select one or more data cells of the data statement 218 to be spread. After the user has selected the portion of the data statement, the user may select a data cell of the standardized spreadsheet 220 to map the data cell of the spreadsheet 220 to the selection portion of the data statement 218. For example, as illustrated in FIG. 7, a user may select two data cells 226 of the current data statement spreadsheet 218. The user may subsequently select a data cell 228 of the standardized spreadsheet 220. In response, the data management system 12 mathematically combines (e.g., sums or subtracts) the data values stored in the selected two data cells 226 of the data statement 218 and stores the combination in the selected data cell 228 of the standardized spreadsheet 220. The data values and formula used to determine the value stored in the data cell 228 of the spreadsheet 220 are displayed in a mapping formula field 224 located above the spreadsheet 220. In addition, the data management server 12 or client machine 50 maps the selected data cells 226 to the data cell 228 of the standardized spreadsheet 220. The server 12 or client 50 may map the cells 226, 228 using one of a number of methods as discussed above in regard to FIG. 2. In one illustrative embodiment, the cells 226, 228 are mapped based on identity data of the cells 226. Specifically, the cells 226, 228 are mapped based on the row and column numbers of the cells 226. The mapping data includes any mathematical function or equation as defined in the formula box 224. The mapping data may be stored on the database server 20 in relation to the selected data cell 228 of the standardized spreadsheet. Specifically, the mapping data includes an identifier such as a numeric or text label which uniquely identifies the data cell of the standardized spreadsheet. The stored mapping data may then be used with subsequent data statements to automatically spread the data of the subsequent data statements.

During the manual spreading of the data statement 218, the user may select a highlight mapped cells button 230 to identify which of the data portions or cells of the data statement 218 spreadsheet have been mapped. The mapped data portions (i.e., data cells) of the data statement spreadsheet 218 are identified to the user by highlighting the data portions. Additionally, the user may determine which data cell(s) of the standardized spreadsheet 220 is mapped to which data portion or cell of the data statement 218 by selecting either the data portion (i.e., one or more data cells) on the data statement 218 or the data cell on the standardized spreadsheet 220. In response, both the data portion of the data statement 218 and the data cells of the standardized spreadsheet 220 are highlighted as illustrated by cells 226, 225 of FIG. 7.

Once the data portions of the data statement 218 have been manually spread to data cells of the standardized spreadsheet 220, the user may submit the mapped standardized spreadsheet to the data analysis program by selecting a submit button 232. In response, the standardized spreadsheet is saved on the database server 20. Additionally, the data contained in the standardized spreadsheet is converted to a format acceptable by the data analysis program.

Figure 8:
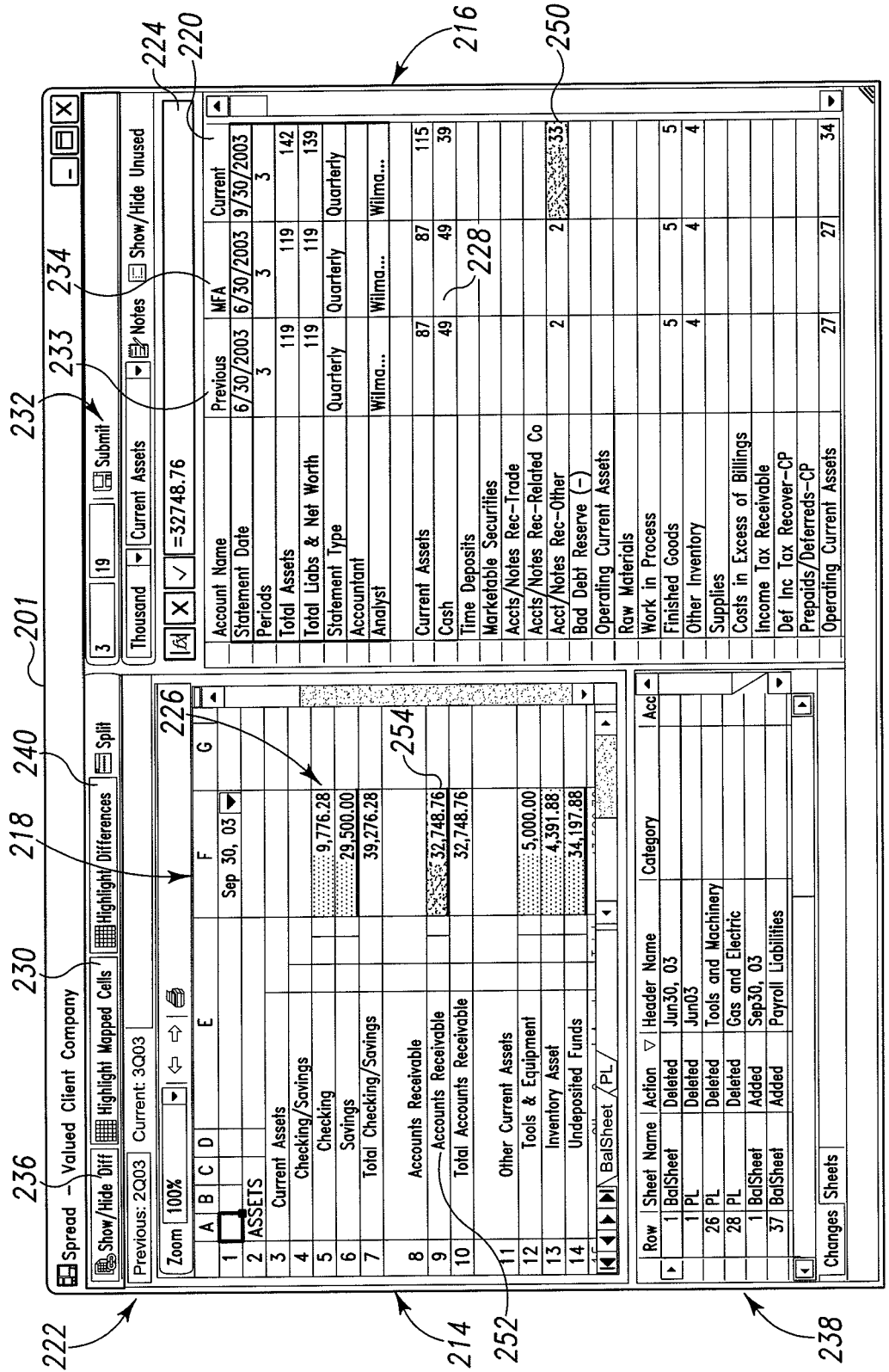

When a data statement has previously been spread for the customer, the newly received data statement spreadsheet is automatically spread when the user selects the spread button 206. As illustrated in FIG. 8, the data statement 218 is spread into the standardized spreadsheet 220 based stored mapping associated with the data cells of the spreadsheet 220. For example, for each data cell of the standardized spreadsheet, the data management server 12 may retrieve mapping data from a storage location such as the database 22 of the data server 20. The mapping data may include an identifier, such as a numeric value or a text label, associated with the particular data cell, identity data associated with one or more portions of the current and/or previous data statement, and any applicable mathematical equation or formula to be used with the data contained in the one or more portions. In addition, the mapping data is modified based on a comparison of a previous data statement and the current data statement as discussed in regard to FIG. 2. Once the mapping data has been updated or modified based on the comparison, the data contained in the portions of the current data statement as defined by the updated identity data is retrieved. The retrieved data is subsequently copied into the data cell of the standardized spreadsheet 220

The user interface 201 may also display a number of standardized spreadsheets to the user. For example, as illustrated in FIG. 8, the user interface 201 may display the current standardized spreadsheet 220, a previous standardized spreadsheet 233, and a data analysis software spreadsheet 234. The spreadsheet 234 reflects the values of the previous standardized spreadsheet 233 as stored in the data analysis software. Accordingly, the data values of the spreadsheets 233 and 234 may vary.

The previous standardized spreadsheet 233 and previous data statements, accessible via the data statement selection bar 222, may be viewed by the user to identify previous mappings. The user may select the highlight mapped cells button 230 to highlight the cells of the data statement 218 which have been mapped to data cells of the current standardized spreadsheet 220. The user may also determine which data cell of the standardized spreadsheet 220 is mapped to which data portion or cell of the data statement 218 by selecting either the data portion (i.e., one or more data cells) on the data statement 218 or the data cell on the standardized spreadsheet 220. In response, both the data portion of the data statement 218 and the data cells of the standardized spreadsheet 220 are highlighted. Additionally, the user may select a show/hide differences button 236 to display a differences pane 238. Differences, such as added and/or deleted rows, between the current data statement and previous data statements are identified in the differences pane 238. Such differences are determined by the data management server 12 by comparing the current data statement with a previous data statement. The previous data statement is selectable by the user and may be the most recently spread data statement spreadsheet or, alternatively, an older data statement spreadsheet.

Figure 9:
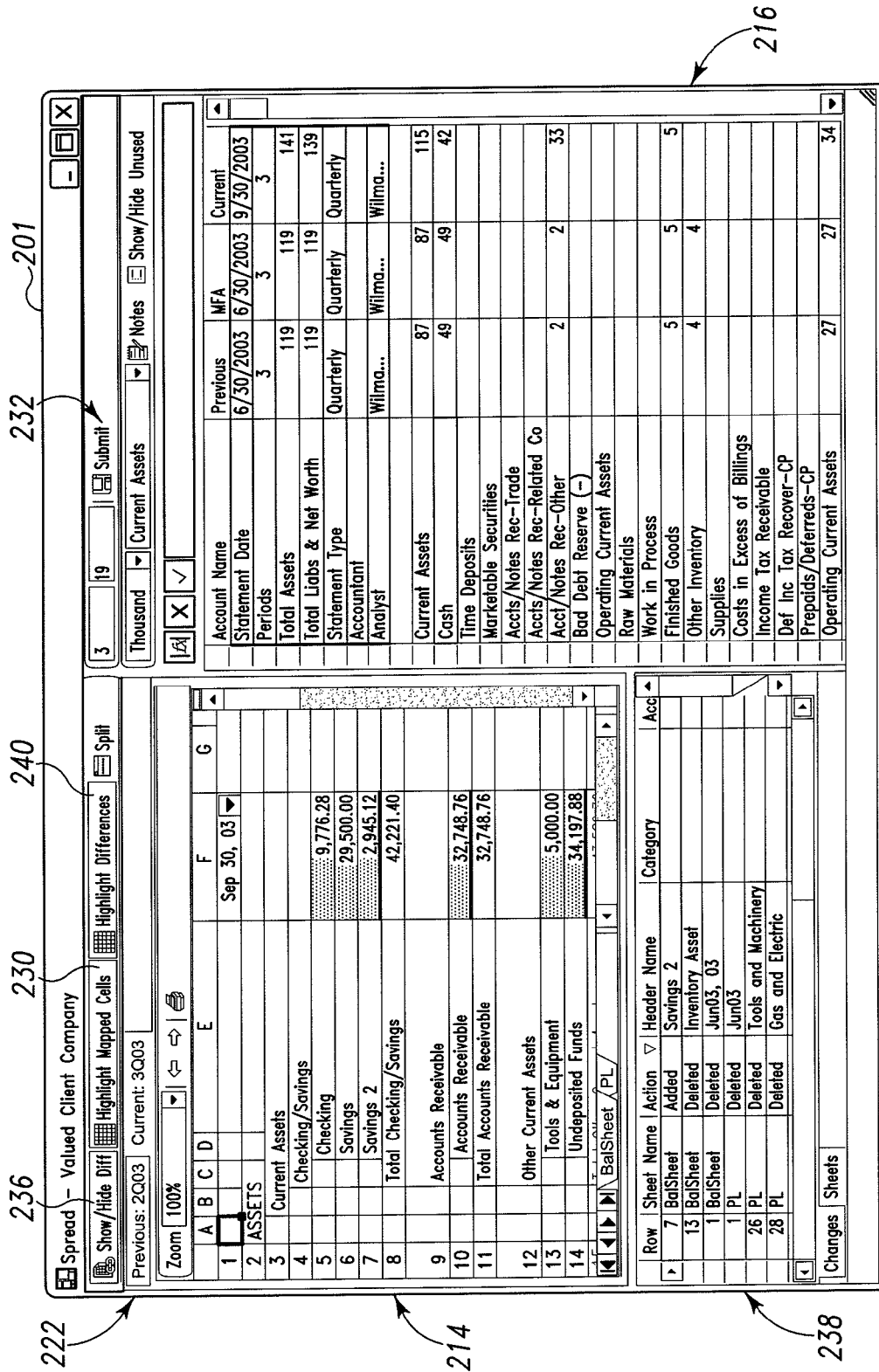

The user may also identify the lines or rows of the current data statement which have been added and the lines or rows of the previous data statement which have been deleted by selecting a highlight differences button 240. When the user selects the button 240, data cells associated with data rows of the current data statement 214 which have been added are relative to the previous data statement are highlighted. As illustrated in FIG. 9, row 7 of the present data statement 214 has been added and is highlighted. Similarly, if a row has been deleted, the row is highlighted in the previous data statement. The data cells may be highlighted in different colors to indicate to the user whether the row has been added or deleted. The differences between the current data statement 214 and the previous data statement are also indicated on the differences pane 238 selectably viewable via the button 236.

Once the data portions or cells of the data statement 218 have been automatically and/or manually spread to data cells of the standardized spreadsheet 220, the user may submit the current standardized spreadsheet to the data analysis program by selecting the submit button 232. In response, the current standardized spreadsheet is saved on the database server 20 and the data contained in the standardized spreadsheet is converted to a format acceptable by the data analysis program and stored on the database sever 30.

Figure 10:
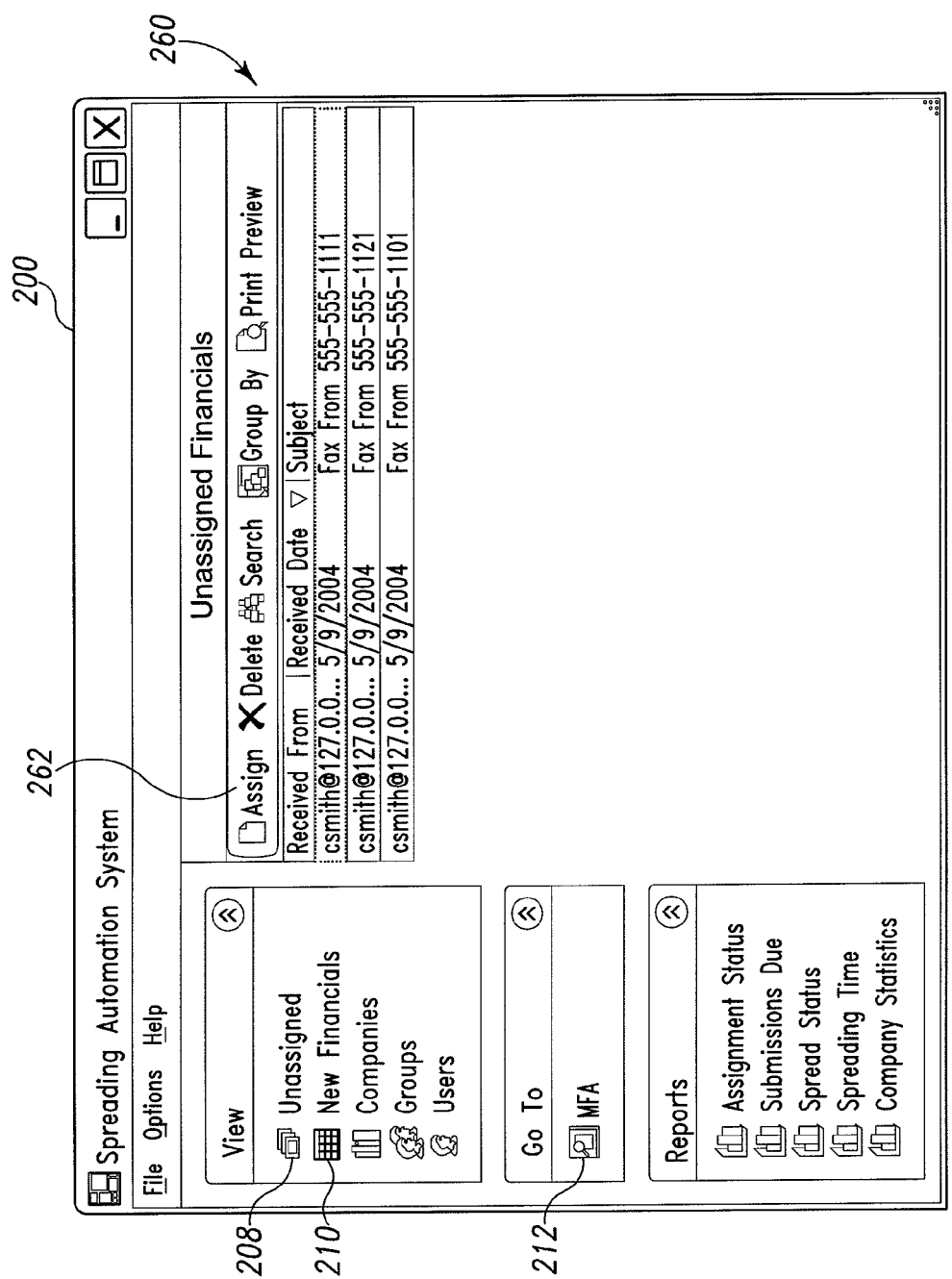

Referring now to FIGS. 10–13, the user may select the unassigned button 208 of the user interface 200 to view data statements, typically embodied as digital images such as digital images of a fax, which have been received but not assigned to a company. When the user selects the button 208, an unassigned financials pane 260 is displayed to the user on the user interface 200 as illustrated in FIG. 10. Any received but unassigned data statements are displayed to the user on the pane 260. Additional data related to the unassigned data statement may also be displayed on the pane 260 including, for example, the date on which the data statement was received and the fax number transmitting the data statement. The user may browse the list of unassigned data statements and select a data statement to assign to a company. Once the user has selected a data statement, the user may assign the data statement to a company by selecting an assign button 262.

Figure 11:
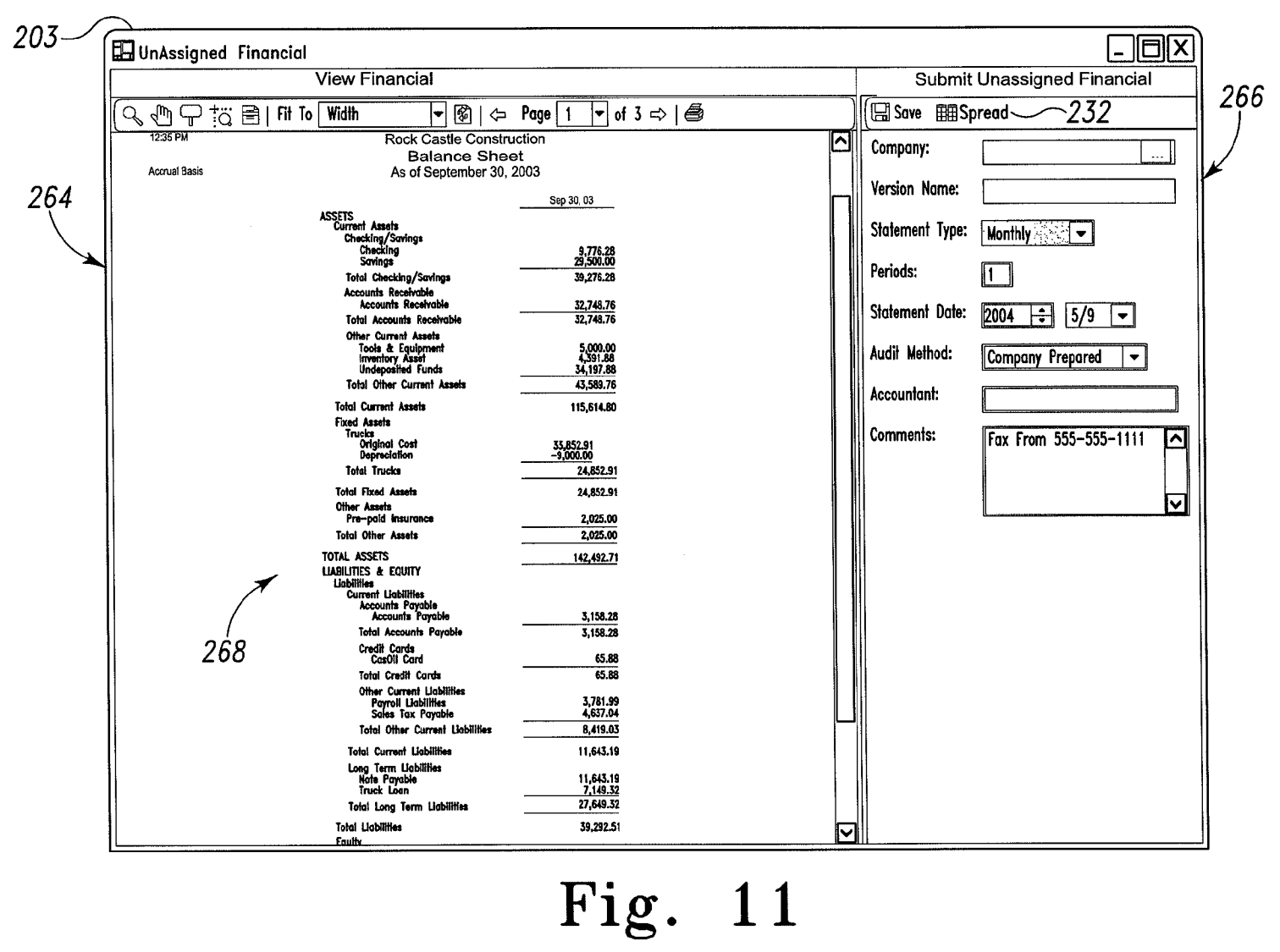

As illustrated in FIG. 11, when the user selects the assign button 262, a user interface 203 is presented to the user. The user interface 201 includes a data statement pane 264 and a submit pane 266. The data statement 268 (i.e., a digital image) is displayed to the user in the pane 264 to allow the user to quickly review the data statement image. The user may supply company identification data in the submit pane 266 to assign the data statement to the company. For example, the user may supply the name of the company, the version name of the data statement, the data statement type, the number of periods included in the data statement, the statement data, the audit method, the associated accountant, and any comments such as the fax number used to transmit the data statement. Once the user has entered in the appropriate identification data in submit pane 266, the user may select the spread button 232 to spread the data statement.

When the user selects the spread button 232 to spread the data statement, a spreading user interface 300 is displayed to the user. The user interface 300 includes a data statement pane 268 and a standardized spreadsheet pane 269. A standardized spreadsheet 270 is displayed in the standardized spreadsheet pane 269. If the data statement 268 is the first data statement to be spread for the company, the user interface 300 will appear similar to the user interface 300 illustrated in FIG. 12. Because there is no previous mapped standardized spreadsheet, the pane 269 includes only the single standardized spreadsheet 270 having empty data cells. Additionally, because there is no previous data statement, a data statement selection bar 222 located above the data statement 268 includes only the current data statement 268.

Figure 12:
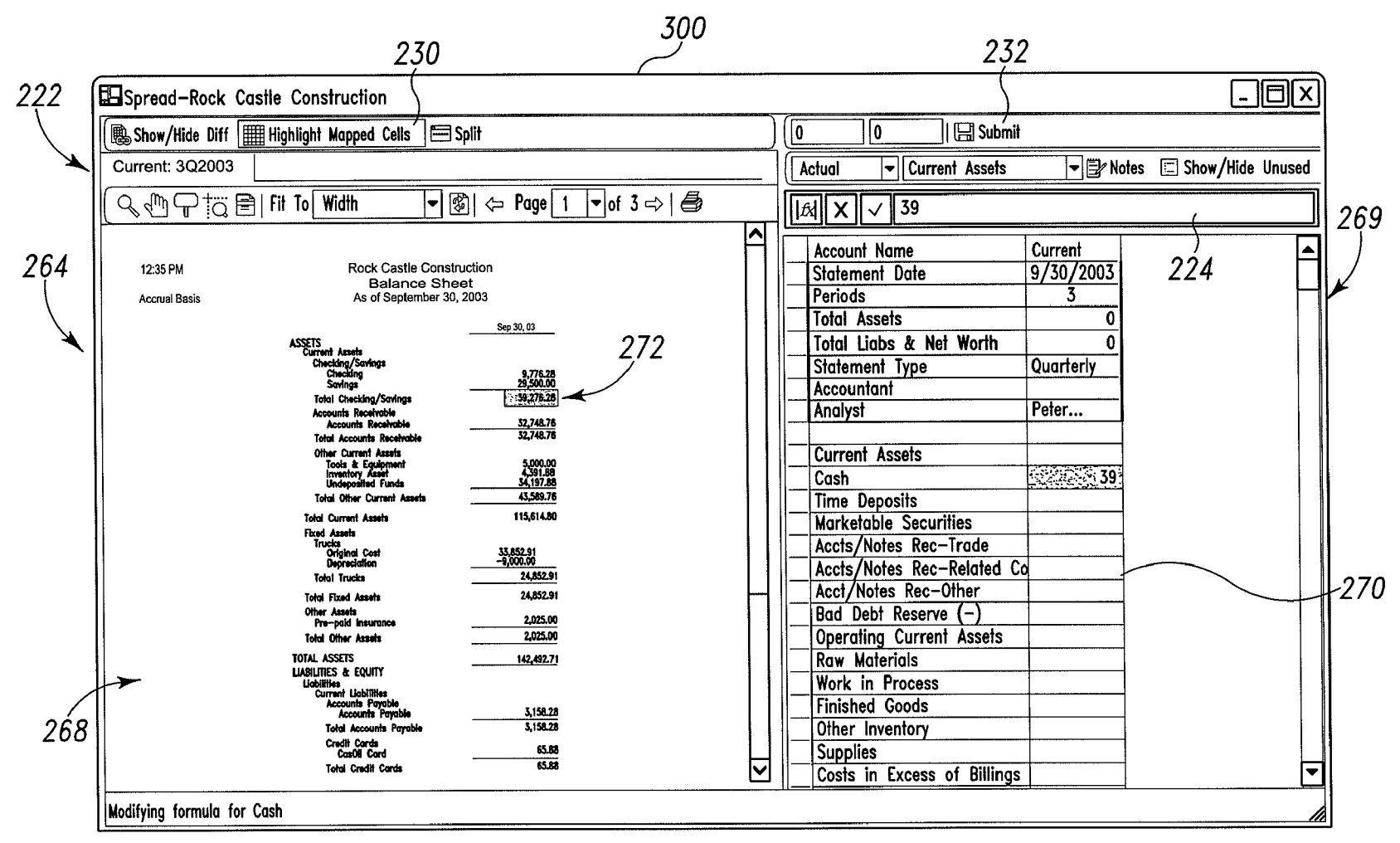

Because the current data statement 268 is a digital image, the data statement 268 must be manually spread. To do so, the user may select a portion of the data statement 268. For example, the user may select a spatial portion of the digital image. As illustrated in FIG. 12, in response to the user's selection, a selection box 272 appears on the image. The user may adjust the size and shape of the selection box 272 to include any of the data present on the data statement 268. The selection box 272 is defined by a set of coordinates which are mapped on the data statement 268. After the user has selected the spatial portion of the data statement 268, the user may select a data cell of the standardized spreadsheet 270 to map the data cell of the spreadsheet 270 to the selected spatial portion of the data statement 268. Because the data statement 268 is not a spreadsheet, the data values contained in the selection box 272 are not automatically copied into the data cell of the standardized spreadsheet 270. Accordingly, the user must enter the data values of the data contained within the selection box 272 into the selected data cell of the standardized spreadsheet 270. Typically, numerical data values are entered based on a data format such as representing currency amounts in thousands and the like. However, the selected data cell of the standardized spreadsheet is automatically mapped to the selected spatial portion of the data statement 268 based on the set of coordinates.

When the user selects the spatial portion of the data statement 268 and the data cell of the standardized spreadsheet 270, the data management server 12 or client 50 maps the data cell of the spreadsheet 270 to the spatial portion. To do so, for example, the data management server 12 may store the set of coordinates which define the selection box 272. The set of coordinates may be stored in relation to the data cell of the standardized spreadsheet 270. For example, the set of coordinates may be stored in an XML file in an association with an identifier (e.g., a number value or a text label) associated with the data cell of the standardized spreadsheet 270. Alternatively, a relationship such as a formula, equation, or data points may be determined to relate the set of coordinates to the data cell of the standardized spreadsheet 270. The set of coordinates and the relationship equation may then be stored and subsequently retrieved to determine the relation of the spatial portion as defined by the set of coordinates and the data cell of the standardized spreadsheet 270

Once a data cell of the standardized spreadsheet 270 has been mapped to a selected data portion (i.e., spatial portion) of the data statement 268, the user may select the highlight mapped cells button 230 to identify which of the data portions of the data statement 268 and which of the data cells of the standardized spreadsheet 270 have been mapped. The mapped data portions are identified to the user by highlighting the associated spatial portions of the data statement 268. Additionally, the user may determine which data cell of the standardized spreadsheet 270 is mapped to which data portion of the data statement 268 by selecting either the data portion (i.e., the spatial portion as defined by the set of coordinates) on the data statement 268 or the data cell on the standardized spreadsheet 270. In response, both the data portion of the data statement 268 and the data cells of the standardized spreadsheet 270 are highlighted as illustrated in FIG. 12.

Once the data portions of the data statement 268 have been manually spread to data cells of the standardized spreadsheet 270, the user may submit the standardized spreadsheet to the data analysis program by selecting the submit button 232. In response, the standardized spreadsheet 270 is saved on the database server 20. Additionally, the data contained in the standardized spreadsheet is converted to a format acceptable by the data analysis program and saved on the data server 30.

Figure 13:
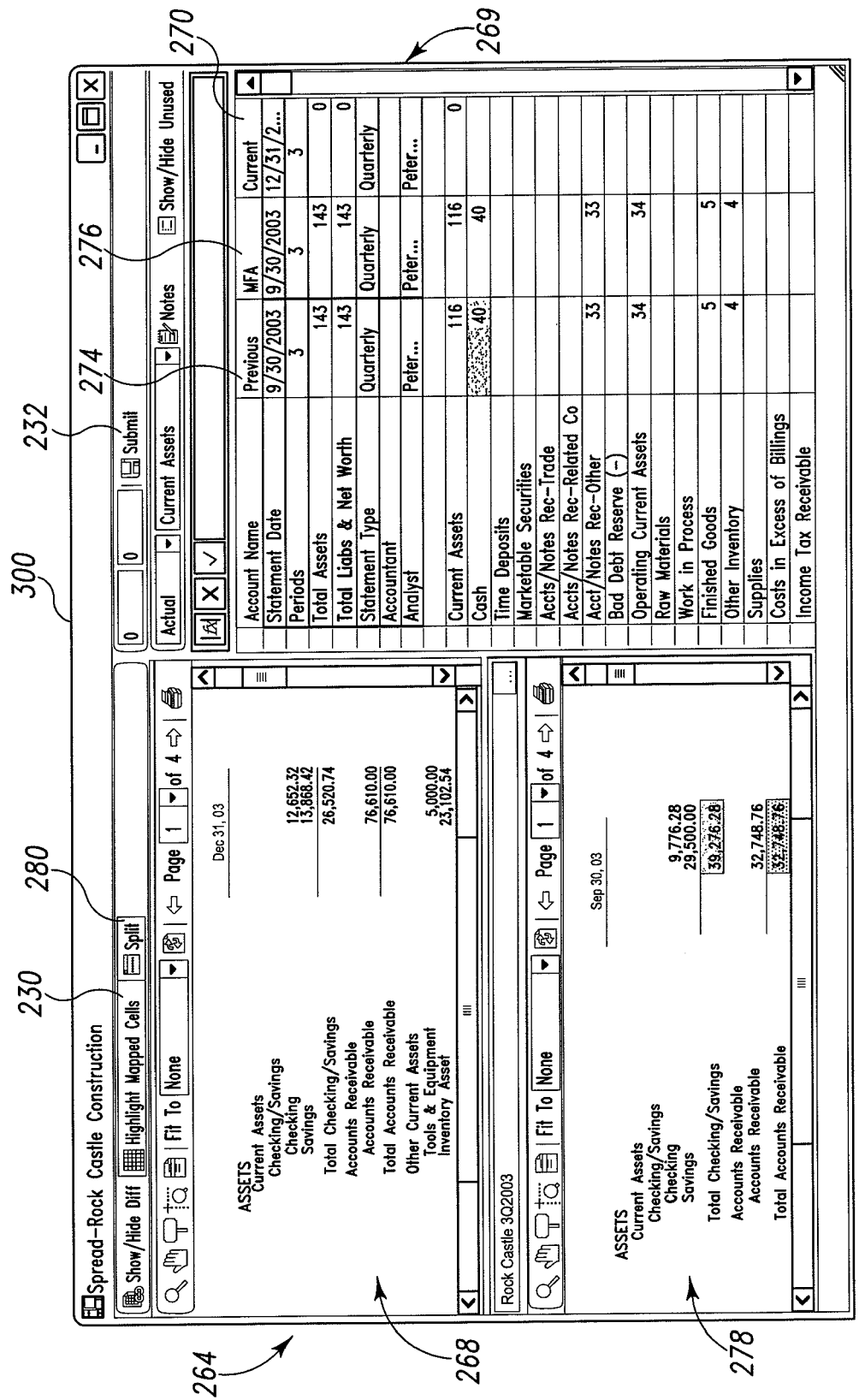

When a data statement has previously been spread for the customer, the user interface 300 may display a number of standardized spreadsheets to the user. For example, as illustrated in FIG. 13, the user interface 300 may display the current standardized spreadsheet 270, a previous standardized spreadsheet 274 and a data analysis software spreadsheet 276. The spreadsheet 276 reflects the values of the previous standardized spreadsheet 276 as stored in the data analysis software. Accordingly, the data values of the spreadsheet 274 and 276 may vary.

As shown in FIG. 13, the current data statement 268 and the previous data statement 278 may be viewed together in the data statement pane 268 by selection of a split button 280. The user may select the highlight mapped cells button 230 to highlight the data portions of the data statement 278 which have been mapped to data cells of the previous standardized spreadsheet 274. The user may also determine which data cell of the previous standardized spreadsheet 274 is mapped to which data portion or spatial portion of the previous data statement 278 by selecting either the data portion on the data statement 278 or the data cell on the previous standardized spreadsheet 274. In response, both the data portion of the data statement 278 and the data cell of the standardized spreadsheet 270 are highlighted. The user may thus analyze the mapping of the previous data statement 278 to use as a guide to spread the current data statement 268 to the current standardized spreadsheet 270 thereby reducing inaccuracies and inconstancies in the spreading process. The previous data statement is selectable by the user and may be the most recently spread data statement spreadsheet or, alternatively, an older data statement spreadsheet.

Once the data portions (i.e., the selected spatial portions) of the data statement 268 have been manually spread to data cells of the current standardized spreadsheet 270, the user may submit the current standardized spreadsheet 270 to the data analysis program by selecting the submit button 232. In response, the current standardized spreadsheet is saved on the database server 20 along with the associated mapping data and the data contained in the standardized spreadsheet is converted to a format acceptable by the data analysis program and stored on the database server 30.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the harness described herein. It will be noted that alternative embodiments of system, method, network server, and article of the present disclosure may not include all of the features described yet still benefit from at least some of the advantages of such features. Those of ordinary skill in the art may readily devise their own implementations of harness that incorporate one or more of the features of the present invention and fall within the spirit and scope of the present disclosure as defined by the appended claims.

The invention claimed is:

1. A method for managing a standardized spreadsheet, the method comprising:
    receiving a first data statement;
    displaying the first data statement and the standardized spreadsheet to a user;
    determining a portion of the first data statement based on a first selection made by the user;
    determining a data cell of the standardized spreadsheet based on a second selection made by the user;
    mapping the data cell of the standardized spreadsheet to the portion of the first data statement;
    receiving a second data statement including a number of portions of data and comparing the second data statement to the first data statement; and
    indicating differences of the second data statement relative to the first data statement to the user comprising indicating to the user which of the number of portions of the second data statement have been added relative to the first statement.

2. The method of claim 1, wherein the receiving step comprises receiving the first data statement via a network.

3. The method of claim 1, wherein the receiving step comprises receiving the first data statement via a publicly-accessible network.

4. The method of claim 1, wherein the receiving step comprises receiving the first data statement via a fax.

5. The method of claim 1, wherein the receiving step comprises receiving the first data statement via an email.

6. The method of claim 1, wherein the first data statement comprises a financial statement.

7. The method of claim 1, wherein the first data statement comprises a product quality statement.

8. The method of claim 1, wherein the first data statement comprises a spreadsheet.

9. The method of claim 1, wherein the first data statement comprises a Microsoft Excel® spreadsheet.

10. The method of claim 1, wherein the displaying step comprises displaying a spreadsheet to the user.

11. The method of claim 1, wherein the standardized spreadsheet comprises an financial industry model spreadsheet.

12. The method of claim 1, wherein the step of determining a portion of the first data statement comprises determining at least one data cell of a spreadsheet having data stored therein based on the selection made by the user.

13. The method of claim 12, wherein the mapping step comprises copying the data of the at least one data cell of the spreadsheet to the data cell of the standardized spreadsheet.

14. The method of claim 12, wherein the step of determining the portion of the first data statement comprises determining at least two data cells of a spreadsheet, and the mapping step comprises mathematically combining the data of the at least one data cell of the spreadsheet and storing the data in the data cell of the standardized spreadsheet.

15. The method of claim 12, wherein the mapping step comprises determining identity data of the at least one data cell of the spreadsheet.

16. The method of claim 15, wherein the identity data comprises row and column numbers associated with the at least one data cell.

17. The method of claim 15, wherein the mapping step comprises storing the identity data.

18. The method of claim 17, wherein storing the identity data comprises storing the identity data in a relationship to the data cell of the standardized spreadsheet.

19. The method of claim 15, wherein the mapping step comprises determining a mathematical equation associated with the at least one data cell of the spreadsheet.

20. The method of claim 19, wherein the mapping step comprises storing the mathematical equation and the identity data in a relationship to the data cell of the standardized spreadsheet.

21. The method of claim 1, wherein determining a data cell of the standardized spreadsheet comprises determining a data cell of an industry financial model spreadsheet based on the selection made by the user.

22. The method of claim 1, further comprising indicating to the user that the data cell of the standardized spreadsheet is mapped to the portion of the first data statement.

23. The method of claim 22, wherein indicating to the user comprises highlighting the portion of the first data statement.

24. The method of claim 1, further comprising notifying the user that the first data statement has been received.

25. The method of claim 24, wherein notifying the user comprises sending an email to the user.

26. The method of claim 1, wherein indicating differences comprises highlighting a data cell of a spreadsheet.

27. A method for managing a standardized spreadsheet, the method comprising:
receiving a first data statement;
displaying the first data statement and the standardized spreadsheet to a user;
determining a portion of the first data statement based on a first selection made by the user;
determining a data cell of the standardized spreadsheet based on a second selection made by the user;
mapping the data cell of the standardized spreadsheet to the portion of the first data statement;
receiving a second data statement including a number of portions of data and comparing the second data statement to the first data statement; and
indicating differences of the second data statement relative to the first data statement to the user comprising indicating to the user which of the number of portions of the second data statement have been deleted relative to the first statement.

28. A computer comprising:
a processor, and
a memory device electrically coupled to the processor, the memory device having stored therein a plurality of instructions which, when executed by the processor, cause the processor to:
retrieve mapping data associated with a data cell of a standardized spreadsheet;
determine at least one data cell of a first spreadsheet based on the mapping data;
retrieve data from the data cell of the first spreadsheet;
store the data in the data cell of the standardized spreadsheet; and
determine differences between the first spreadsheet and a second spreadsheet and modify the mapping data based on the differences.

29. The computer of claim 28, wherein the mapping data comprises identity data of the at least one data cell of the first spreadsheet.

30. The computer of claim 28, wherein the identity data comprises row and column numbers of the at least one data cell.

31. The computer of claim 28, wherein the identity data comprises a mathematical formula.

32. The computer of claim 28, wherein the plurality of instructions further cause the processor to determine at least one data cell of the second spreadsheet based on the modified mapping data.

33. The computer of claim 32, wherein the plurality of instructions further cause the processor to retrieve data from the data cell of the second spreadsheet and store the data in the data cell of the standardized spreadsheet.

* * * * *